United States Patent
Paliarush et al.

(10) Patent No.: US 12,462,442 B2
(45) Date of Patent: Nov. 4, 2025

(54) GEOLOCATION-BASED BACKGROUND GENERATION FOR OBJECT IMAGES

(71) Applicant: Adobe Inc., San Jose, CA (US)

(72) Inventors: Oleksandr Paliarush, Cedar Park, TX (US); Michele Saad, Austin, TX (US); Bingxuan Liang, Seattle, WA (US); Saina Lajevardi, Austin, TX (US)

(73) Assignee: Adobe Inc., San Jose, CA (US)

( * ) Notice: Subject to any disclaimer, the term of this patent is extended or adjusted under 35 U.S.C. 154(b) by 255 days.

(21) Appl. No.: 18/238,749

(22) Filed: Aug. 28, 2023

(65) Prior Publication Data

US 2025/0078323 A1 Mar. 6, 2025

(51) Int. Cl.
*G06T 11/00* (2006.01)
*G06Q 30/0601* (2023.01)

(52) U.S. Cl.
CPC .......... *G06T 11/00* (2013.01); *G06Q 30/0643* (2013.01); *G06T 2200/24* (2013.01)

(58) Field of Classification Search
None
See application file for complete search history.

(56) References Cited

U.S. PATENT DOCUMENTS

| | | | |
|---|---|---|---|
| 10,783,398 B1* | 9/2020 | Ranzinger | G06F 16/56 |
| 2018/0060358 A1* | 3/2018 | Jiang | G06F 16/9538 |
| 2019/0050427 A1* | 2/2019 | Wiesel | G06T 19/00 |
| 2019/0080351 A1* | 3/2019 | Garg | G06Q 30/0253 |
| 2022/0150553 A1* | 5/2022 | Ravuru | H04N 21/23439 |
| 2024/0355019 A1* | 10/2024 | Assouline | G06V 40/161 |

OTHER PUBLICATIONS

GB Application No. GB2407566.5 Combined Search and Examination Report, Oct. 4, 2024, pp. 1-6.

* cited by examiner

*Primary Examiner* — Edward Martello
(74) *Attorney, Agent, or Firm* — Kilpatrick Townsend & Stockton LLP

(57) ABSTRACT

Systems and methods for generating geolocation-based images for a target object are provided. A geolocation module receives a set of geolocations associated with a geographic region of interest. Each geolocation of the set of geolocations is mapped to context data associated with the geolocation. A prompt generation module generates multiple prompts based on the set of geolocations and the context data. The prompt generation module comprises a first generative artificial intelligence (AI) model. An image generation module generates multiple synthetic images based on the multiple prompts. The image generation module comprises a second generative AI model. Each synthetic image depicts the target object in a background generated based on a prompt.

20 Claims, 19 Drawing Sheets

GEOLOCATION-BASED BACKGROUND GENERATION FOR OBJECT IMAGES

TECHNICAL FIELD

This disclosure relates generally to generative artificial intelligence (AI). More specifically, but not by way of limitation, this disclosure relates to geolocation-based background generation for object images using generative AI.

BACKGROUND

The advancement of digital technologies and platforms allows users to perform various actions from anywhere in a digital space, such as attending virtual exhibition or conducting interactions. Object images provided on these online platforms are a crucial part of how the online platforms communicate with their users and present their offerings about the objects. Online platforms strive to provide visually appealing object images that resonate with user preferences, identities, and interest to improve user engagement and interaction with the online platforms.

SUMMARY

Certain embodiments involve geolocation-based background generation for object images using generative AI. In one example, an image generation server receives a set of geolocations associated with a geographic region of interest. Each geolocation of the set of geolocations is mapped to context data associated with the geolocation. The image generation server generates multiple prompts based on the set of geolocations and the context data using a first generative AI model. The image generation server generates a set of background images based on the multiple prompts using a second generative AI model. The image generation server generates multiple synthetic images. Each synthetic image includes a background image from the set of background images and an image of a target object.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

FIG. 13 depicts an example of a GUI displaying synthetic images with geolocation-based backgrounds on a marketplace platform, according to certain embodiments of the present disclosure.

FIG. 16 depicts another example of a GUI displaying synthetic images with geolocation-based model faces deployed on the market platform, according to certain embodiments of the present disclosure.

FIG. 17 depicts an example of a GUI displaying original object images with white backgrounds on a marketplace platform, according to certain embodiments of the present disclosure.

DETAILED DESCRIPTION

Figure 1:
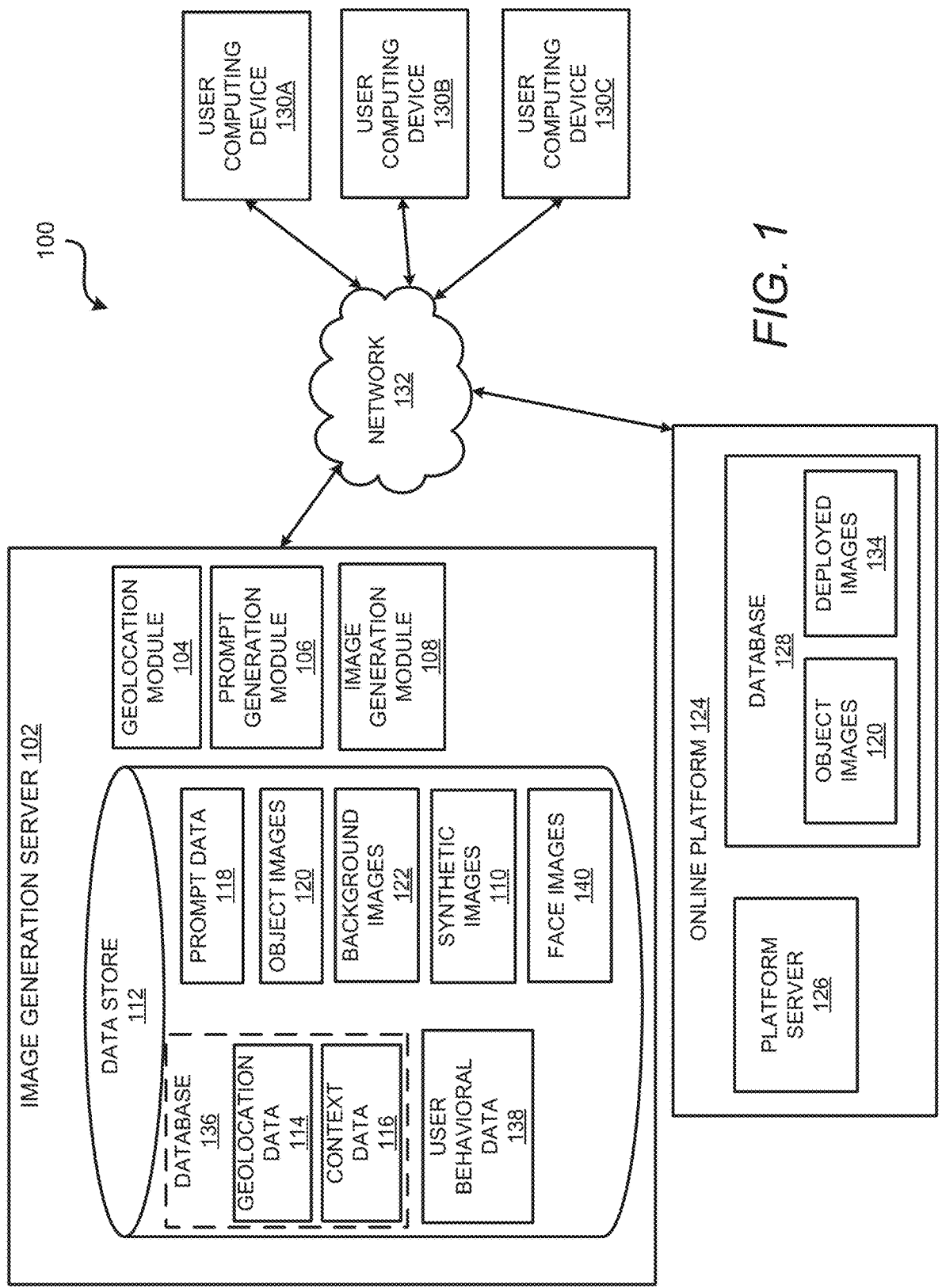
FIG. 1 depicts an example of a computing environment in which an image generation server generates synthetic images with geolocation-based backgrounds for target objects, according to certain embodiments of the present disclosure.

The present disclosure provides techniques for generating geolocation-based backgrounds for object images using generative AI. Most object images on online platforms are as simple as an object against a plain white background. Some object images are taken across various locations to feature the object against visually appealing backgrounds to capture user attention. The process of going to various locations for photoshoots is costly, non-scalable, and may not even resonate with users across various regions. Some object images are shot with human models or props (e.g., mannequin) on a flat background, and different background images are shot separately. The object images and background images are then combined in photo-editors (e.g., Adobe Photoshop®). This is less costly, but still requires manual processing of every object image. Thus, it is still problematic to maintain multiple variations of the same object image for users from different regions.

In an embodiment of the present disclosure, an image generation server can generate geolocation-based backgrounds for an object image using generative AI. The object images shows an object against a flat, e.g., white, background. The image generation server then combines each of the generated backgrounds with a copy of the object image to create synthetic images, each showing the object against a different one of the generated backgrounds.

In one example, an operator of an online platform selects at least one object image and at least one geographic region of interest. The operator may select the geographic regions(s) by interacting with a map or other suitable input means. The online platform provides information, such as name(s) or coordinates, relating to the geographic region(s) to an image generation server. The image generation server accesses a data store to retrieve certain context information associated with the geolocation(s), such as places of interest, landmarks, seasons, weather, terrain, events, demographic composition, etc.

The image generation server uses a text generative AI model to generate multiple prompts based on the geolocations and the associated context information. A prompt may include certain context data already associated with a geolocation and/or any new context data or other information output by the text generative AI model. The image generation server then inputs one or more of the generated prompts to an image generative AI model to generate synthetic images of a target object a background based on one or more of the generated prompts and an image of the target object. The background is generated based on the one or more of the generated prompts. As an example, a synthetic image may show the target object against a background depicting certain landmarks or other context features associated with the selected geolocation. The synthetic images can be displayed in a graphical user interface (GUI) so that an operator of the online platform can select the most desirable of the synthetic images. The selected synthetic images can be deployed on the on online platform, which in some examples may be or include an online catalog.

The context data associated with a geolocation that is input to the generative AI model can be weighted and re-weighted in a dynamic manner based on various factors, such as behavioral data collected in response to user interaction with the deployed synthetic images. User behavioral data may include information such as how long a user interacts with a synthetic image and whether the user further engaged with the online platform with respect to the object depicted in the synthetic image, e.g., by conducting further searches for or purchasing the target object. In some examples, a reinforcement learning model is implemented to learn the user behavioral data associated with a deployed synthetic image. Weighting and re-weighting context data allows the text generative AI model to generate optimal prompts for users on the online platform in the specific geographic region.

Certain embodiments of the present disclosure overcome the disadvantages of the prior art, by generating geolocation-based backgrounds for object images using generative AI. The employed process automatically generates prompts using weighted context data associated with a geolocation using a text generative AI model. Different backgrounds are generated based on the prompts using an image generative AI model. Objects offered by an online platform can be depicted in images with different backgrounds associated with the geolocation. Thus, the proposed image generation server enables an online platform to scale the object image generation by deploying cost-effective generative AI models to generate a wide array of images starting from a single object image. Operators of the online platform do not need to go to different locations for photoshoots or manually process images with different backgrounds. Meanwhile, the proposed image generation server enables the online platform to provide personalized experience to users with different backgrounds depending on user geolocation. In turn, users with personalized experiences on the online platform improve user engagement, user conversion, or other performance indicators for the online platform.

As used herein, the term "geographic region" or "geographic region of interest" refers to an area on earth. An online platform can describe a geographic region by its name or boundary in the map. For example, the geographic region is Argentina.

As used herein, the term "geolocation," "a set of geolocations," or "geolocation data" refers to one or more location spots within a geographic region. The one or more locations can be represented by coordinates. For example, within the geographic region of Argentina, there are many locations.

As used herein, the term "object" or "target object" is used to refer to a thing that is visible or perceivable, offered by an online platform. Examples of objects can be products offered on a marketplace platform.

As used herein, the term "object image" is used to refer to an image or picture that features an object. The object image may have a white background or a different background with a different color or scene. For example, an object image can be a product image featuring a product on a marketplace platform.

At used herein, the term "background" is used to refer to the overall scene behind a main object in an image. For example, a background of an object image is just white color. Also for example, a background for an object image is certain landscape, such as a forest.

As used herein, the term "background image" is used to refer to an image serving as the overall scene where an object can be featured. A background image can be generated by an image generative AI model based on a prompt describing an overall scene. The background image can be combined with an object image to a new image, so that the background image provide background to the object in the new image.

As used herein, the term "face image" is used to refer to an image of a human face. The face image can be generated by an image generative AI model based on a prompt describing a human face. A face image can feature a face of a man at a specific geolocation (e.g., China, or India).

As used herein, the term "synthetic image" is used to refer to a generated image either by an image generative AI model or certain image editing tool. The synthetic image features an object extracted from an object image with a unique background provided by a background image or on a model whose face is provided by a face image.

As sued herein, the term "deployed image" is used to refer to certain synthetic images that are selected by an operator of an online platform to be displayed on the online platform, or that are automatically transmitted from an image generator sever to an online platform and used by the online platform. For example, an image generation server generates multiple synthetic images and an operator of an online platform select a subset of the multiple synthetic images to be used on the online platform. The subset of the multiple synthetic images are deployed images.

As used herein, the term "generative artificial intelligence," "generative AI," or "generative AI model" is used to refer to a type of AI system capable of generating text, images, or other media in response to prompts. Examples of text generative AI systems include Generative Pre-training Transformer (GPT), Text-To-Text Transfer Transformer (T5), Open Pre-trained Transformer (OPT), Bidirectional Auto-Regressive Transformer (BART), Language Model for Dialogue Applications (LaMDA), or any variations. Examples of image or art generative AI systems include Stable Diffusion, Midjourney, and DALL-E.

As used herein, the term "prompt" is used to refer to text or information provided to an AI model as an input or "command" for the AI model to generate its output. An example prompt for generating a synthetic image of an object is "woman camping in California wilderness." The prompt can specify what part of the image needs to be generated, for example, a background, a face. Alternatively, the prompt is a description of a final image an operator wants, and the AI model interprets what parts of an object image needs to be regenerated.

As used herein, the term "mask," "background mask," or "face mask" is used to refer to a type of filter which performs operation directly on an image. The filter can be in a form of a grayscale or binary image. For example, a background mask can be overlaid on an image to remove the background pixels in the image.

Referring now to the drawings, FIG. 1 depicts an example of a computing environment 100 in which an image generation server 102 generates synthetic images 110 with geolocation-based backgrounds for target objects, according to certain embodiments of the present disclosure. In various embodiments, the computing environment 100 includes an image generation server 102 connected with an online platform 124 and user computing devices 130A, 130B, and 130C (which may be referred to herein individually as a user computing device 130 or collectively as the user computing devices 130) via a network 132. A user computing device 130 can be a desktop computer, a laptop computer, a tablet, a smart phone, or any suitable computing device. The network 132 may be a local-area network ("LAN"), a wide-area network ("WAN"), the Internet, or any other networking topology known in the art that connects the user computing device 130 to the online platform 124.

The online platform 124 includes a platform server 126 and a database 128. Examples of the online platform 124 can include marketplace platforms offering certain products or services, or any other suitable online platform that uses images to showcase offered objects. The database 128 stores object images 120 and deployed images 134. The object images 120 include images of a target object on a white background or on any other flat background. Object images 120 may be shot using a white or other flat background or may be created by applying an image editing technique to remove a non-flat background. Deployed images 134 include at least some synthetic images 110, which depict target objects with geolocation-related backgrounds generated by the image generation server 102. The deployed images 134 are displayed on the online platform 124 for users of the online platform 124 to view, for example via user computing devices 130.

The image generation server 102 includes a geolocation module 104, a prompt generation module 106, an image generation module 108, and a data store 112. The geolocation module 104 is configured to receive information about one or more geographic region of interest. The information may be in the form of the names of the geographic region or geolocation coordinates or other identifiers. An operator of the online platform 124 can define or select the geographic region of interest via a GUI, such as an interactive map. The GUI may be provided by the image generation server 102 or may be provided by the online platform 124. In other words, in some embodiments the operator may access the image generation server 102 directly through interfaces provided by the image generation server 102 or indirectly via interfaces provided with the online platform 124. In still other embodiments, the operator may use a user computing device 130 to access the online platform 124 and/or the image generation server 102.

In some embodiments, the geolocation module 104 receives the name of a geographic region of interest from the operator of the online platform 124. The geolocation module 104 matches the geographic region with geolocation data 114 to identify a set of geolocations within a boundary of the geographic region of interest. For example, geolocations within the boundary of the geographic region of interest may be subregions, such as states, counties, cities, towns, etc. The geolocation module 104 maps the geolocations to context data 116 also stored in the data store 112 or otherwise accessible to the image generation server 102. In some examples, a machine learning model is implemented to learn the context data 116 associated with the identified geolocations from a set of available data sources, such as information on the internet. The mapped geolocation data 114 and context data 116 can be stored in separate databases or within the same database 136, for example as two or more tables in the database 136.

The selected geolocation data 114 and associated context data 116 are input to the prompt generation module 106, which is configured to generate multiple prompts using a text generative AI model. The text generative AI model is trained to generate prompts based on the geolocation data 114 and the context data 116 associated with the selected set of geolocations. In some examples, prompts generated by the prompt generation module 106 are displayed to an operator of online platform 124 such that the operator can select one or more of the prompts to be provided to the image generation module 108. In other embodiments, the generated prompts are input directly to the image generation module 108 without input by the operator.

In some examples, the prompt generation module 106 implements a reinforcement learning model, e.g., Markov Decision Process, to determine and assign weights to the context data 116 based on various factors, including whether backgrounds generated using various prompts are included in synthetic images 110 selected by the operator for deployment to the online platform 124 and user behavioral data 138 associated with synthetic images deployed to the online platform 124. As will be understood by those skilled in the art, context data 116 with heavier weights can have greater influence on the output of the text generative AI model used to generate the prompts.

Prompts generated by the prompt generation module 106 are stored as prompt data 118 within the data store 112 provided to the image generation module 108, which is configured to generate backgrounds, faces, or any suitable items based on the prompts. An operator of the online platform 124 can select one or more prompts from the prompt data 118 for the image generation module 108 to generate background images using the selected prompts. Alternatively, the prompts generated by the prompt generation module 106 are provided to the image generation module 108 automatically without intervention from an operator of the online platform 124. The image generation module 108 can implement an image generative AI model trained to generate a set of background images based on one or more of the prompts. In some examples, image generation module 108 also generates the synthetic images 110 by combining each background image 122 with a copy of an object image 120. Background images 122 and object images 120 can be combined by the same or a different image generative AI module that was used to generate the background images 122, or by way of any suitable image editing application. Background masks can be used to remove backgrounds from object images 120 to leave only target objects. The background images generated using prompts are used as backgrounds for target objects in the synthetic images 110. In some examples, the image generation module 108 generates a background for an object in the object image base on the selected prompt, without generating separate background images 122, to create a synthetic image 110. The synthetic image 110 depicts the object in a background generated based on the selected prompt.

The synthetic images 110 are displayed via a GUI to an operator of the online platform 124. The operator of the online platform 124 can select one or more synthetic images 110 for deploying on the online platform 124. In response to the selection, the image generation module 108 then transmits the one or more selected synthetic images to the online platform 124 for deployment, which are stored as deployed images 134 in database 128 of the online platform 124.

In some embodiments, the operator of the online platform 124 constructs multiple geographic-specific presentations of synthetic images 110, such as geographic-specific catalogs. The geographic-specific presentations of synthetic images 110 can be a subset of deployed images 134 on the online platform 124. Examples may include different presentations of synthetic images 110 per country, per state, per city, etc. There is no limit to the manner in which the operator can define geographic regions. Each geographic-specific presentation of synthetic images 110 includes synthetic images 110 having backgrounds generated based on the geolocation data 114 and context data associated with the geographic region. Geographic-specific presentations of synthetic images 110 are stored in the data store 112 of the image generation server 102, in the database 128 of the online platform 124, or in some other data store accessible to the online platform 124. Geographic-specific presentations of synthetic images 110 are retrieved and displayed to users who access the online platform 124 from the relevant geographic regions. For example, the user's geographic region can be detected based on the IP address associated with the user computing device 130 or from other markers like customer profile information.

In other embodiments, the operator of the online platform 124 may select a number of synthetic images 110 covering many geographic regions and store the set of synthetic images 110 in the data store 112 of the image generation server 102, in the database 128 of the online platform 124, or in some other data store accessible to the online platform 124. Then, when a user accesses the online platform 124 via a user computing device 130 or by other means, a geographic-specific presentation of synthetic images 110 can be generated and presented to the user in real or near real time based on the user's geographic region.

In some examples, the image generation module 108 is configured to generate a set of face images 140 as opposed to or in addition to the background images 122. Face images are images of faces that can be added to human models shown in synthetic images 110. For example, the prompt generation module 106 may be used to generate prompts describing characteristics of persons who live in the geographic region, e.g., a country. The prompts can then be used by the image generation module 108 to generate face images 140 that can be combined with object images 120 to produce synthetic images 110. In some examples, the synthetic image includes a human modeling the target object, such as a piece of clothing. The synthetic image 110 may also include a background associated with the relevant geographic region. The image generation module 108 can implement an image generative AI model trained to generate a set of face images based on multiple prompts. The image generative AI model for face images can be the same model used for generating background images 122. Alternatively, the image generative AI model for face images is a separate AI model. In some examples, the image generation module 108 is configured to generate a set of background images 122 and a set of face images based on multiple prompts and generate synthetic images by combining the background images 122 and face images with an object image 120.

In some examples, the image generation module 108 is configured to generate synthetic images by generating a background and/or a face in an object image based on a selected prompt, without generating separate background or face images. The selected prompt can describe the synthetic image in its entirety. For example, the selected prompt is "young man in the street of Paris." The image generation module 108 can implement a generative AI model can be configured to interpret the selected prompt to generate a background, or a face, or both based on the selected prompt. For this example prompt, the generative AI model can generate backgrounds depicting the streets of Paris and faces for young men in Paris to be incorporated into an object image.

Figure 2:
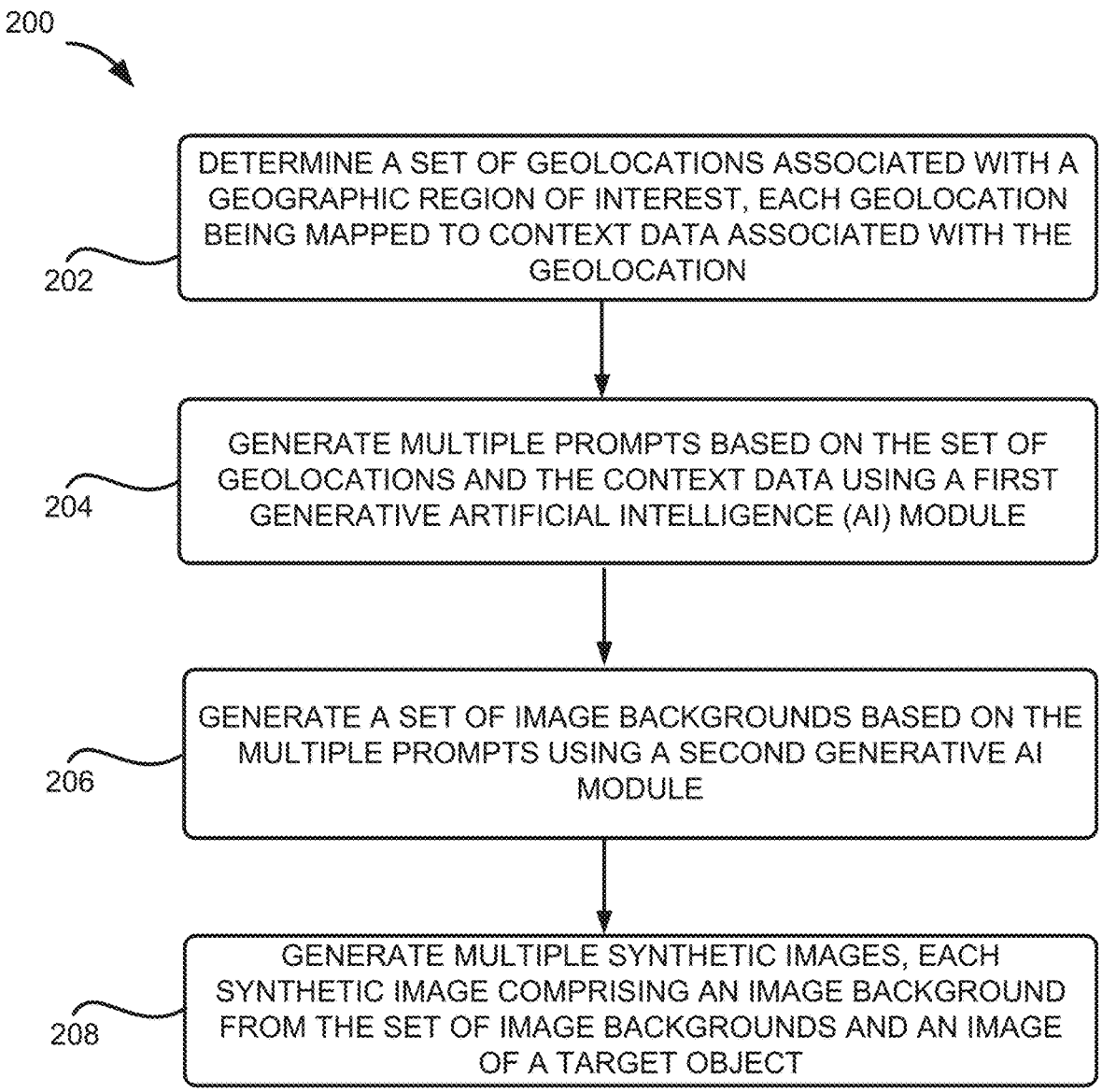
FIG. 2 depicts an example of a process for automatically generating synthetic images with geolocation-related backgrounds for a target object, according to certain embodiments of the present disclosure.

FIG. 2 depicts an example of a process 200 for automatically generating synthetic images 110 with geolocation-related backgrounds for a target object, according to certain embodiments of the present disclosure. At block 202, a geolocation module 104 determines a set of geolocations associated with a geographic region of interest. Each geolocation of the set of geolocations is mapped to context data 116 associated with the geolocation. An image generation server 102 can provide a GUI to an operator of the online platform 124. In some embodiments, the geolocation module 104 of the image generation server 102 can provide a map via the GUI for the operator to select a geographic region of interest, for example by drawing a boundary of a region on the map. Alternatively, or additionally, the operator can type, select, or use other means to input text describing the geographic region of interest (e.g., Argentina) via the GUI. The geolocation module 104 receives the geolocation information associated with the geographic region of interest, for example, boundaries or location names. In some examples, the data store 112 of the image generation server 102 stores context data 116 predefined for various geolocations. The predefined context data 116 can be specified by a subject matter expert or learned by a machine learning model beforehand. The context data 116 can include places of interest, landmarks, terrain, climate, weather, events, demographic composition, income level, urbanization level, culture, etc. In some examples, the geolocation module 104 includes a machine learning model trained to dynamically extract context data 116 associated with geolocations identified by the online platform 124. For example, the geolocation module 104 can implement a pre-trained large language model (LLM) via an Application Programming Interface (API) to provide context data 116 for geolocations identified by the online platform 124. When a set of geolocations associated a geographic region of interest are received from the online platform 124, the geolocation module 104 can provide an instruction to the pre-trained LLM. The instruction can include certain geolocation data 114 associated with the geographic region of interest. For example, the instruction is "provide a description about Argentina including its trendy cities, landmarks, places or interest, terrain, popular events, weather, climate, and other interesting information." The pre-trained LLM then provides a summary of context data 116 for the identified geolocations.

At block 204, a prompt generation module 106 generates multiple prompts based on the set of geolocations and the context data 116 using a first generative artificial intelligence (AI) model. The multiple prompts are part of the prompt data 118. The prompt generation module 106 implements a text generative AI model for generating prompts for another generative AI model used at block 206 below for generating images. An example prompt is "generate an image of Quebrada de Humahuaca in Argentina." The text generative AI model can be a pre-trained LLM, such as GPT, T5, OPT, BART, or their variations. In some examples, the pre-trained LLM provides an API for the prompt generation module 106 to access the pre-trained LLM.

In some examples, the prompt generation module 106 weights different types of context data 116 associated with a geolocation such that context data 116 with heavier weight is emphasized more strongly by the text generative AI model, so as to generate optimal prompts. Alternatively, the prompt generation module 106 can weight prompts previously generated by the prompt generation module 106 or otherwise specified by the operator with types of context data and select optimal prompts for generating images. For example, if a synthetic image 110 generated using prompt A from the prompt data 118 is selected by an operator of online platform 124, prompt A can be weighted heavier than other prompts. The prompt generation module 106 can provide prompt A to the image generation module 108 more often than other prompts. Also, if a synthetic image 110 generated using prompt A and selected by an operator to be used on the online platform 124 attracts more online visitors and converts more online visitors to become customers, prompt A can be provided to the image generation module 108 more often than other prompts for image generation. The prompt generation module 106 can implement a reinforcement learning model (e.g., Markov Decision Process) to learn the weighting of different types of context data 116 and the usefulness/success of the generated text prompts based on whether a background image 122 or a background generated based on a prompt is included in a synthetic image that is selected to be deployed on an online platform 124. Weighting can also or alternatively be based on user behavioral data 138 associated with user interactions with the one or more deployed images 134, including user engagement (e.g., whether the deployed image 134 generated higher engagement with the product), user conversion (e.g., whether the used image led users to purchase the product), or other performance indicators collected or received by the online platform 124.

At block 206, an image generation module 108 generates a set of background images 122 based on the multiple prompts using a second generative AI model. The image generation module 108 implements an image generative AI model for generating one or more background images 122 based on the prompts generated at block 204. In some examples, the image generation module 108 also generates a set of face images 140 based on prompts generated at block 204. An example face prompt is "generate faces for men in Paris." The image generation module 108 can implement the image generative AI model for background generation or a different image generative AI model to generate face images 140 based on the face prompts. The image generative AI model(s) used for generating background images 122 and face images 140 can be pre-trained text-to-image AI models, for example Stable Diffusion, DALL-E, or variations thereof. The pre-trained text-to-image AI model(s) can provide an API for the image generation module 108 to access the pre-trained text-to-image AI models. However, generating separate background images or separate face images at block 206 can be optional. The image generation module 108 can generate a synthetic image directly using an object image and a prompt, without generating separate background images or face images, as will be described at block 208 below.

At block 208, the image generation module 108 generates multiple synthetic images 110. In some examples, each synthetic image 110 is generated based on a background image 122 and an object image. The image generation module 108 synthesizes a background image 122 and an object image 120 using image editing techniques. The generative AI model implemented by the image generation module 108 at block 206 also takes an object image 120 as an input to generate a synthetic image 110 showing the target object on the background provided by the background image 122. The object image 120 can be an image showing the target object on a white background or other flat background. Background masks is also provided to the image generation module 108 as an input to the image generation module 108. The background masks can be created by an image editing tool (e.g., Adobe Photoshop®) or accessed via an API to the image editing tool. A background mask identifies and removes the background of an object image 120. So that the background image 122 can be added to be the background of the target object.

In some examples, face images 140 are also generated either automatically or requested by an operator of the online platform 124. The face images 140 and face masks are also used to generate the synthetic images 110. A face mask removes a model's original face in an object image 120. A face image 140 is added to the face location to provide a different face than the original. Thus, the synthetic images 110 can include backgrounds and human faces corresponding to a specific geographic region for the online platform 124. The online platform 124 can select and display certain synthetic images 110 as deployed images 134 for users located in the specific geographic region.

In some examples, the image generation module 108 generates a synthetic image directly, without generating separate background images or face images based on separate prompts and combining with the object image, by using an object image and one prompt. The image generative AI model implemented by the image generation module 108 is configured to interpret the prompt and generate a background, or a face, or both, based on the prompt. The prompt can describe the final image that an operation of an online platform wants. The image generation module 108 can automatically generate a background mask for the background in the object image and/or a face mask for a face in the object image. In some examples, the face in an object image may be protected against masking, and the face then may not be regenerated. An example prompt is "young man in the street of Paris." The image generative AI model in this example generates both a background depicting the street of Paris and a face depicting a young man in Paris. If a face exists in an object image and the face in an object image is not protected, the image generative AI model regenerates the face in the object image representing a young man in Paris in addition to generating the background depicting the street of Paris in the object image. Functions included in blocks 206 and 208 can be used to implement a step for generating one or more synthetic images 110 based on the selected prompt(s).

Figure 3:
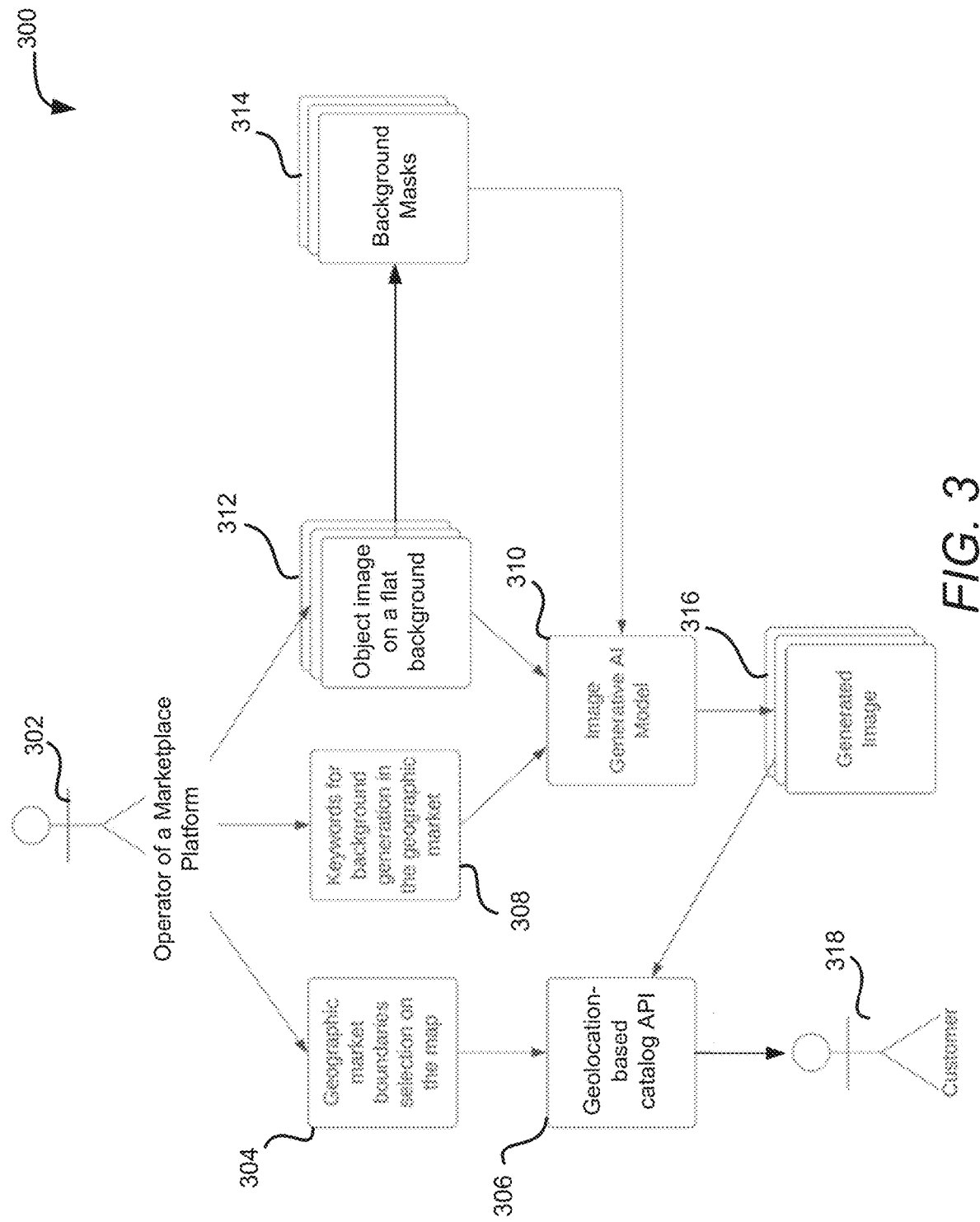
FIG. 3 is an example workflow of generating synthetic images for a marketplace platform based on geolocations, according to certain embodiments of the present disclosure.
Figure 5:
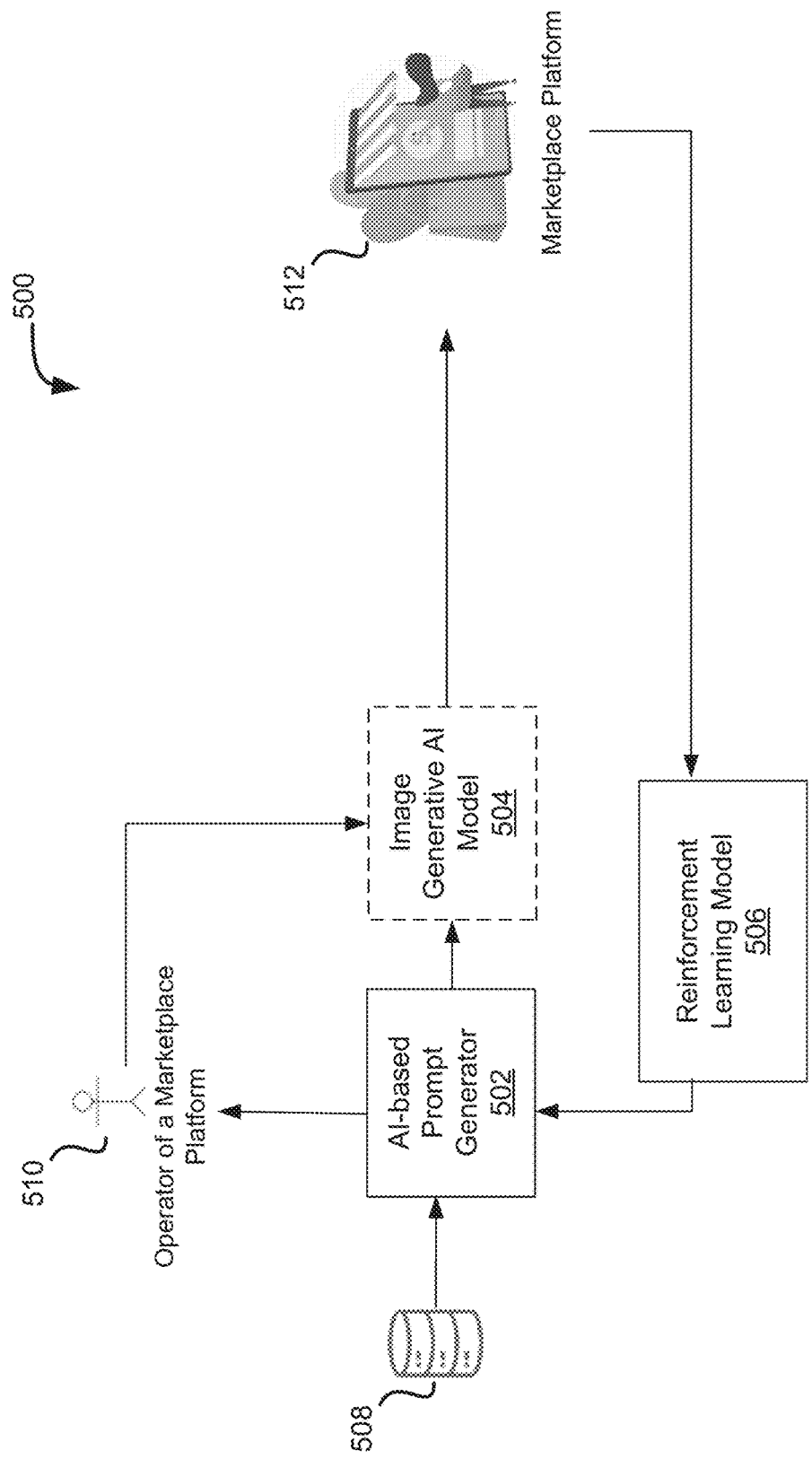
FIG. 5 is an example workflow of generating optimal prompts to an image generative AI model for generating synthetic images for a marketplace platform based on geolocations, according to certain embodiments of the present disclosure.

FIG. 3 is an example workflow 300 of generating geolocation-based object images for a marketplace platform, according to certain embodiments of the present disclosure. In this example, an operator of a marketplace platform 302 provides a selection 304 of geographic market boundaries on a map to a geolocation-based catalog API 306 provided by an image generation server (e.g., an image generation server 102). Meanwhile, the operator of the marketplace platform 302 also provides keywords 308 for background generation in the geographic market defined by the selection 304 of geographic market boundaries. The keywords 308 can be manually provided by the operator of the marketplace platform. Alternatively, or additionally, the keywords can be generated by a machine learning model as illustrated in FIG. 5 below. The keywords are related to places of interest, landmarks, terrain, climate, weather, events, or other information associated with the geolocations within the selection 304 of geographic market boundaries. The keywords 308 serve as prompts to an image generative AI model 310 for generating images. The operator of the marketplace platform 302 also provides one or more object images 312, each showing a certain product on a flat background. The object images 312 are provided as input to the image generative AI model 310. Background masks 314 for the object images 312 can be generated using an image editing tool (e.g., Photoshop®). The background masks 314 are also provided to the image generative AI model 310. Alternatively, the object images 312 can be processed with background masks 314 to become object images 312 without backgrounds, which are then provided to the image generative AI model 310. The image generative AI model 310 generates synthetic images 316 using the keywords 308, object images 312, and background masks 314. The synthetic images 316 include images of the objects in the object images 312, but with a background generated based on the geolocation-related keywords 308. The synthetic images 316 are then provided to the geolocation-based catalog API 306 for selection and deployment on the market platform. Customers 318 from the geographic market can then view the synthetic images with geolocation-based backgrounds generated specific for the geographic market.

Figure 4:
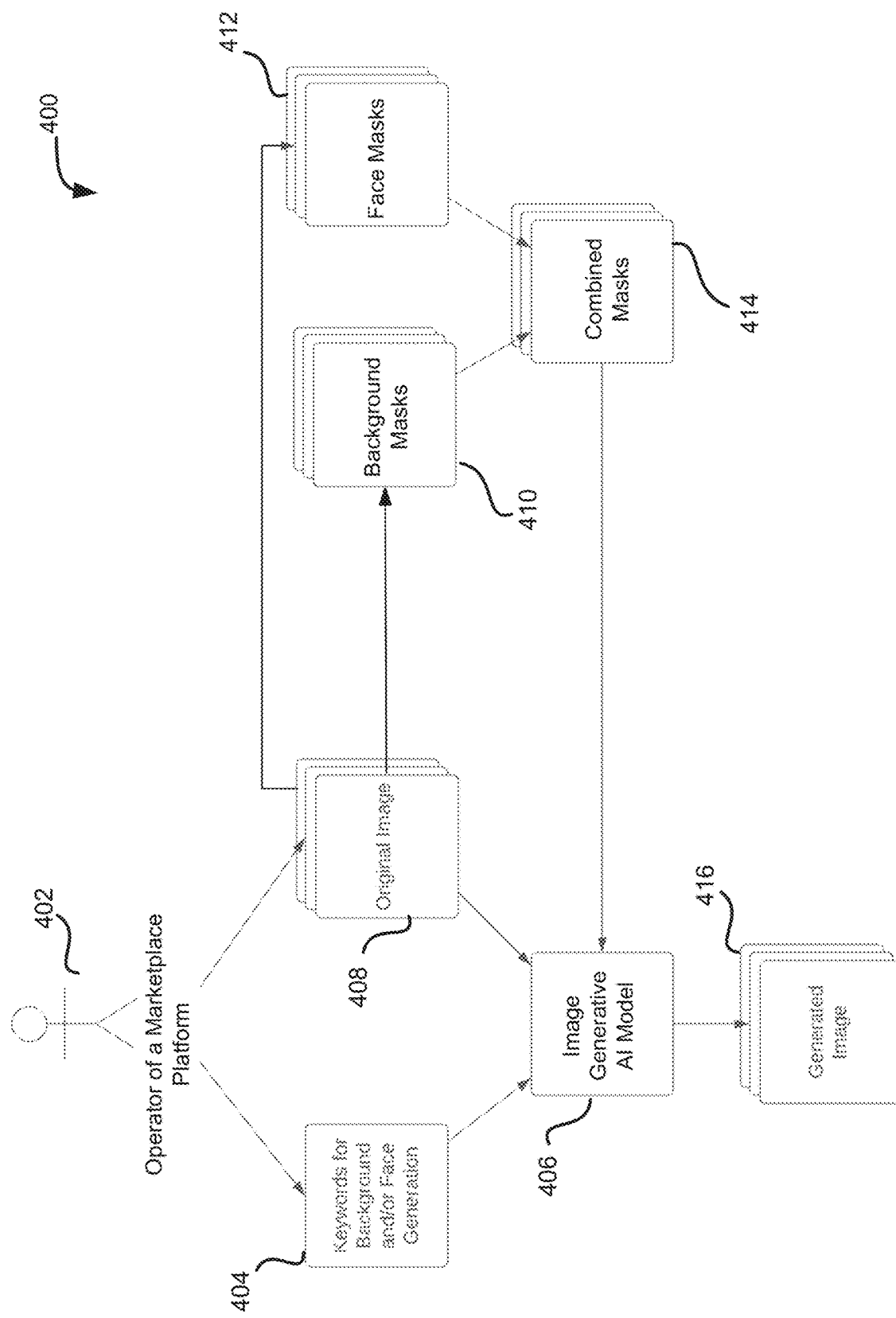
FIG. 4 is another example workflow of generating synthetic images for a marketplace platform based on geolocations, according to certain embodiments of the present disclosure.

FIG. 4 is another example workflow 400 of generating synthetic images for a marketplace platform based on geolocations, according to certain embodiments of the present disclosure. In this example, an operator of a marketplace platform 402 provides keywords 404 for background generation and/or face generation. The keywords 404 can be manually provided by the operator of the marketplace platform 402. Alternatively, or additionally, the keywords 404 can be generated by a machine learning model as illustrated in FIG. 5 below. The keywords 404 associated with geolocations within a predefined geographic market for the marketplace platform can include places of interest, landmarks, terrain, climate, weather, events, or other information associated with the geolocations within the predefined geographic market. The keywords 404 serve as prompts to an image generative AI model 406 for generating images. The operator of the marketplace platform 402 also provides original images 408 of one or more merchandises offered by the marketplace platform with a flat background to the image generative AI model 406. Background masks 410 for the original images 408 can be generated using an image editing tool (e.g., Photoshop®). Face masks 412 can be generated using a face recognition tool (e.g., a face recognition tool built with Python®). The background masks 410 and the face masks 412 can be combined into combined masks 414. The combined masks 414 are also provided to the image generative AI model 406. The image generative AI model 406 generates geolocation-based images 416 using the keywords 404, original images 408, and the combined masks 414. The geolocation-based images 416 include images of a merchandiser in the original images 408 with a background generated based on the geolocation-related keywords 404 and also with a model whose face is generated based on the geolocation-related keywords 404. The geolocation-based images 416 can be provided to the market platform for selection and deployment in the specific geographic market via a geolocation-based image API similar to the geolocation-based catalog API 306 in FIG. 3.

FIG. 5 is an example workflow 500 of generating optimal prompts to an image generative AI model 504 for generating synthetic images for a marketplace platform based on geolocations, according to certain embodiments of the present disclosure. In some examples, an AI-based prompt generator 502 uses geolocation-associated context data 508 to generate multiple prompts for the image generative AI model 504. In some examples, the multiple prompts are provided to an operator of a marketplace platform 510. The operator of the marketplace platform can select one or more prompts from the multiple prompts as prompts to the image generative AI model 504. Either way, the image generative AI model 504 receives prompts and generate image backgrounds based on the prompts. The image generative AI model 504 further generates synthetic images with the generated backgrounds using the prompts and object images with flat backgrounds, as described in FIG. 3 or FIG. 4.

In FIG. 5, a reinforcement learning model 506 is provided to learn the importance or weight of different types of context data based on the customer behavioral data related to images generated using context data-based prompts and deployed on the marketplace platform 512. The importance or weights learned by the reinforcement learning model 506 is then provided to the AI-based prompt generator 502 to generate optimal prompts for the image generative AI model 504. For example, the reinforcement learning model 506 uses a Markov Decision Process to learn the weightage of different context data and the usefulness/success of the generated text prompts based on (1) whether the marketplace platform ends up selecting the generated images associated with a certain generated prompt, and (2) whether the used image generated higher engagement with the product, higher conversion, or other key performance indicators (KPIs) measured as a function of customer behaviors. The reinforcement learning model 506 monitors customer behaviors on the marketplace platform 512 and collect customer behavioral data to analyze the importance or weightage of different context data represented by the generated images deployed on the marketplace platform 512.

Figure 6:
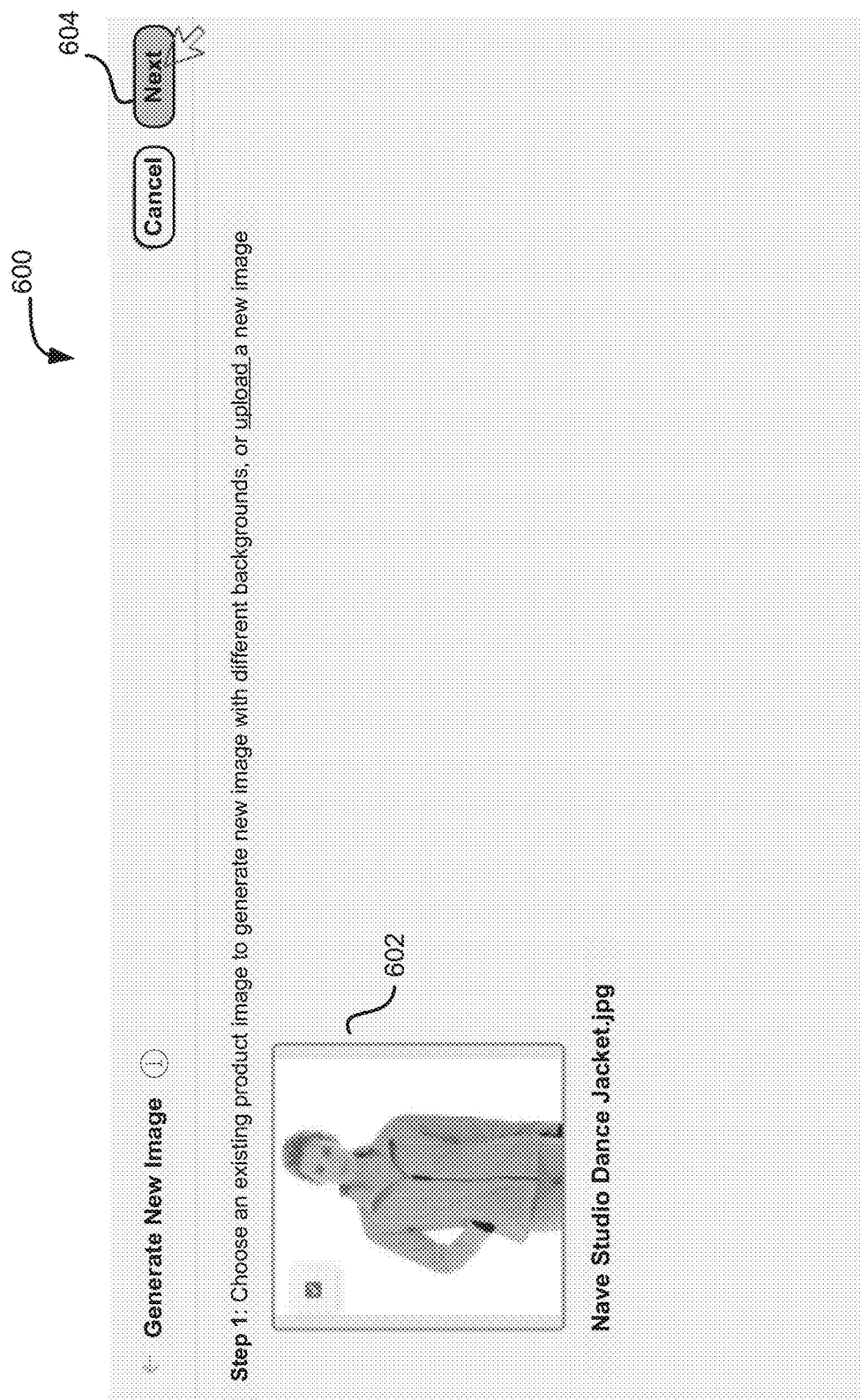
FIG. 6 depicts an example of a GUI for choosing an existing object image for generating new synthetic images with different backgrounds, according to certain embodiments of the present disclosure.

FIG. 6 depicts an example of a GUI 600 for choosing an existing object image for generating new synthetic images with different backgrounds, according to certain embodiments of the present disclosure. The GUI 600 enables an operator of an online platform 124 to interact with an image generation server 102. In this example, the online platform 124 is a marketplace platform and the object image 120 is a product image 602. An operator of the marketplace platform can choose an existing product image 602 or upload a new image not yet existing on the marketplace platform. Once a product image 602 is chosen or uploaded, the operator can move to the next step by clicking or pressing the "next" button 604.

Figure 7:
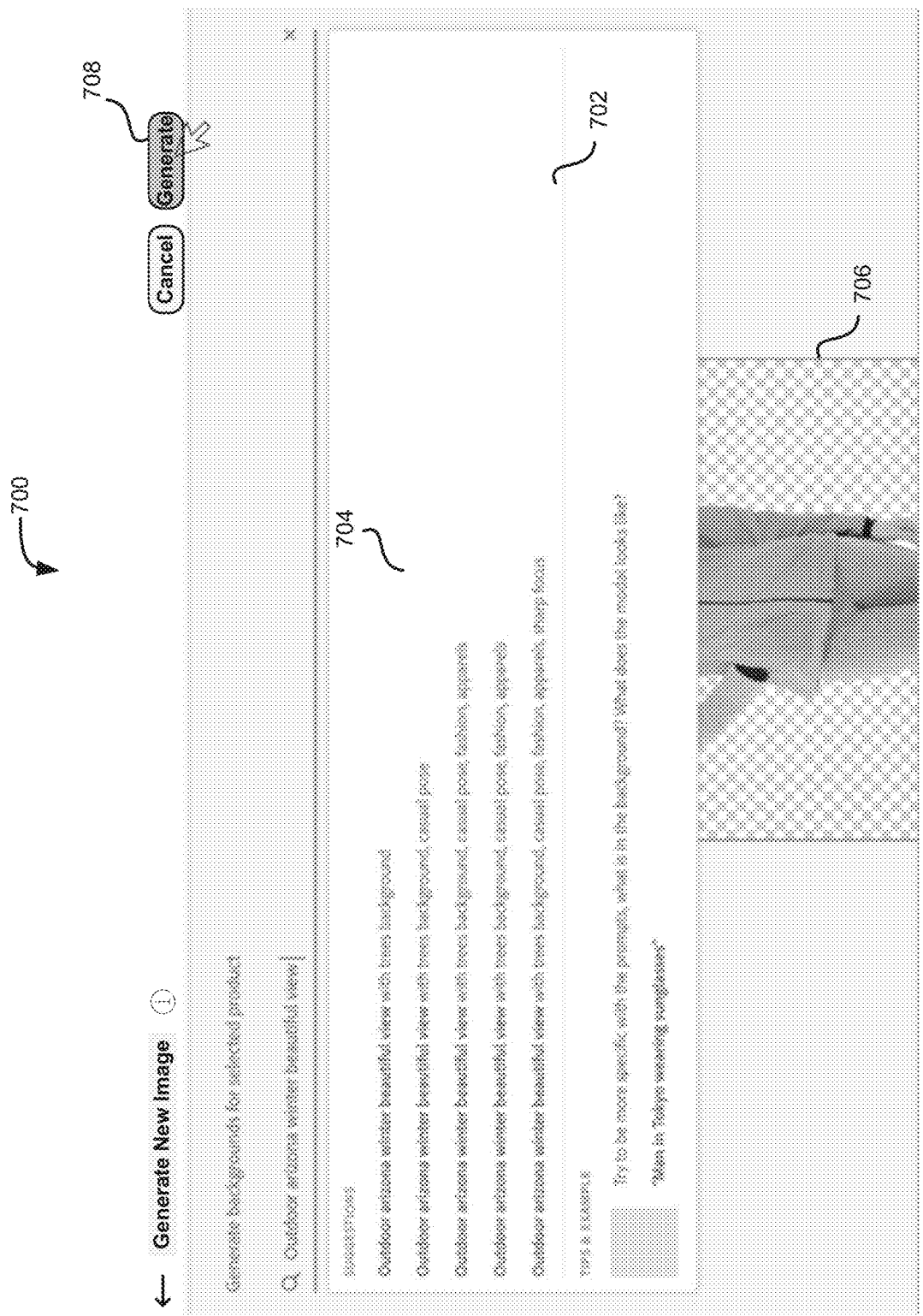
FIG. 7 depicts an example of a GUI for providing descriptive prompts for generation of backgrounds for new synthetic images to be generated, according to certain embodiments of the present disclosure.

FIG. 7 depicts an example of a GUI 700 for providing descriptive prompts for generation of backgrounds for new synthetic images to be generated, according to certain embodiments of the present disclosure. The GUI 700 enables the operator to type their own prompt or select a prompt from suggested prompts 702 to fill in the input field 704. The suggested prompts 1102 are generated by a prompt generation module 106 on an image generation server 102. The product image 706 at this step shown in GUI 700 is the product image 602 in FIG. 6 whose background is removed from previous steps. New synthetic images can be generated based on the descriptive prompt in the field 704 when the operator clicks or press the "generate" button 708.

Figure 8:
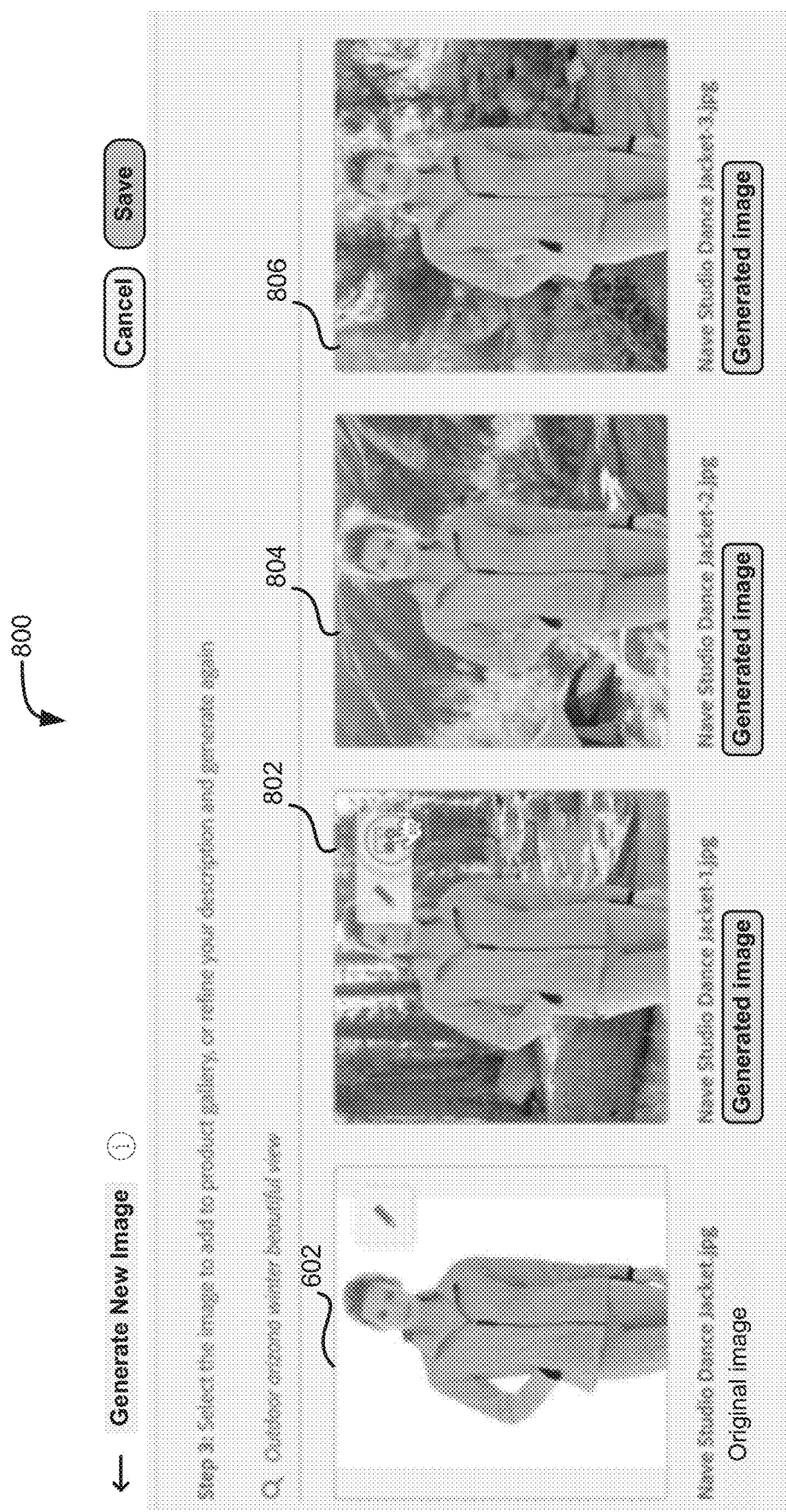
FIG. 8 depicts an example of a GUI displaying new synthetic images generated based on the prompt provided in FIG. 7, according to certain embodiments of the present disclosure.

FIG. 8 depicts an example of a GUI 800 displaying new synthetic images generated based on the prompt provided in FIG. 7, according to certain embodiments of the present disclosure. Three new synthetic images 802, 804, and 806 are generated, by the image generation module 108, for the product image 602 chosen in FIG. 6. Each of the new synthetic images 802, 804, and 806 includes a background generated based on the prompt "outdoor Arizona winter beautiful view" as provided in FIG. 7. The operator of the marketplace platform may select one or more new synthetic images 802, 804, and 806 to be used on the marketplace platform and displayed to customers in Arizona.

Figure 9:
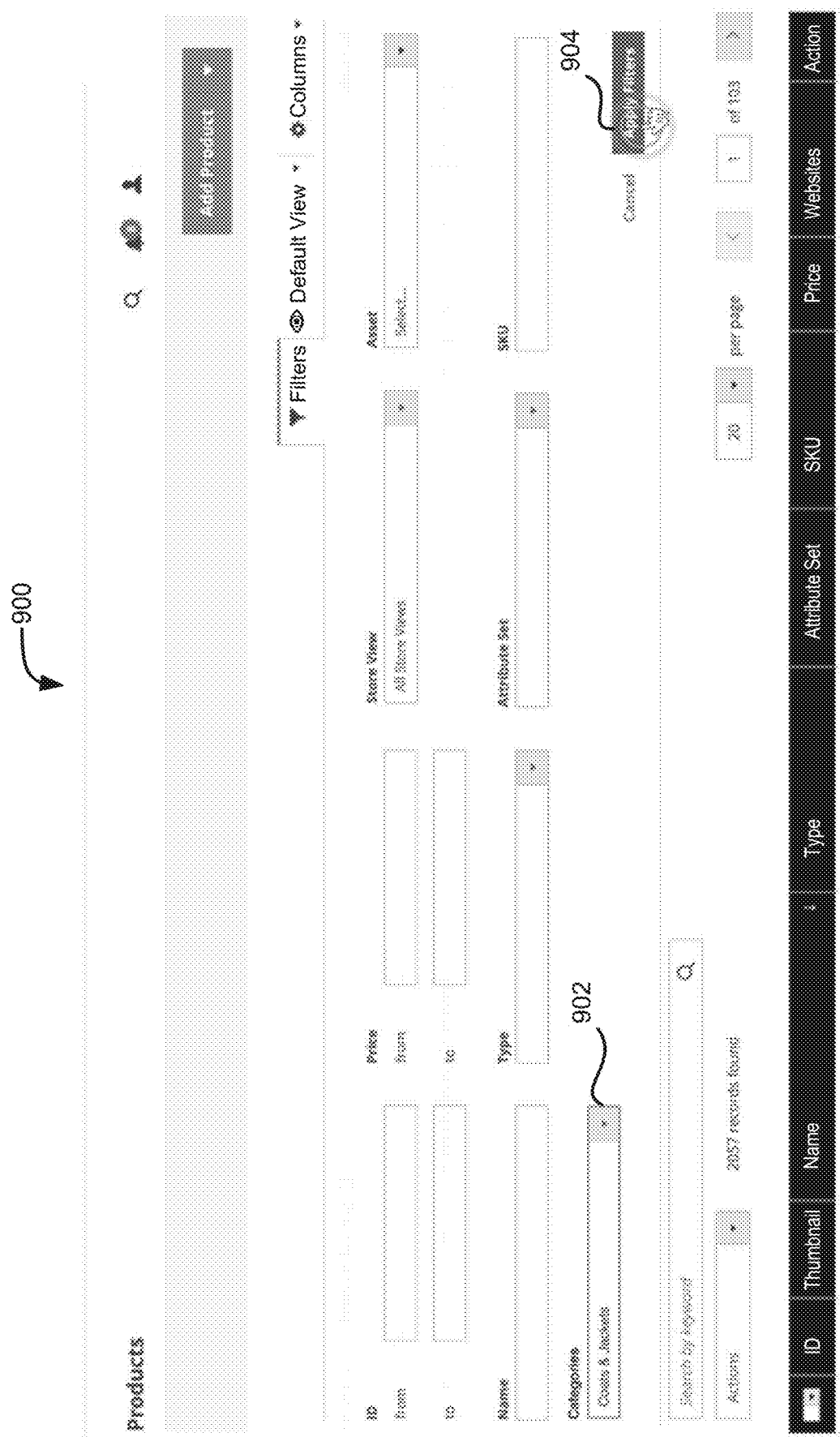
FIG. 9 depicts an example of a GUI for using various filters to select multiple products for generating new synthetic images with geolocation-based backgrounds, according to certain embodiments of the present disclosure.
Figure 10:
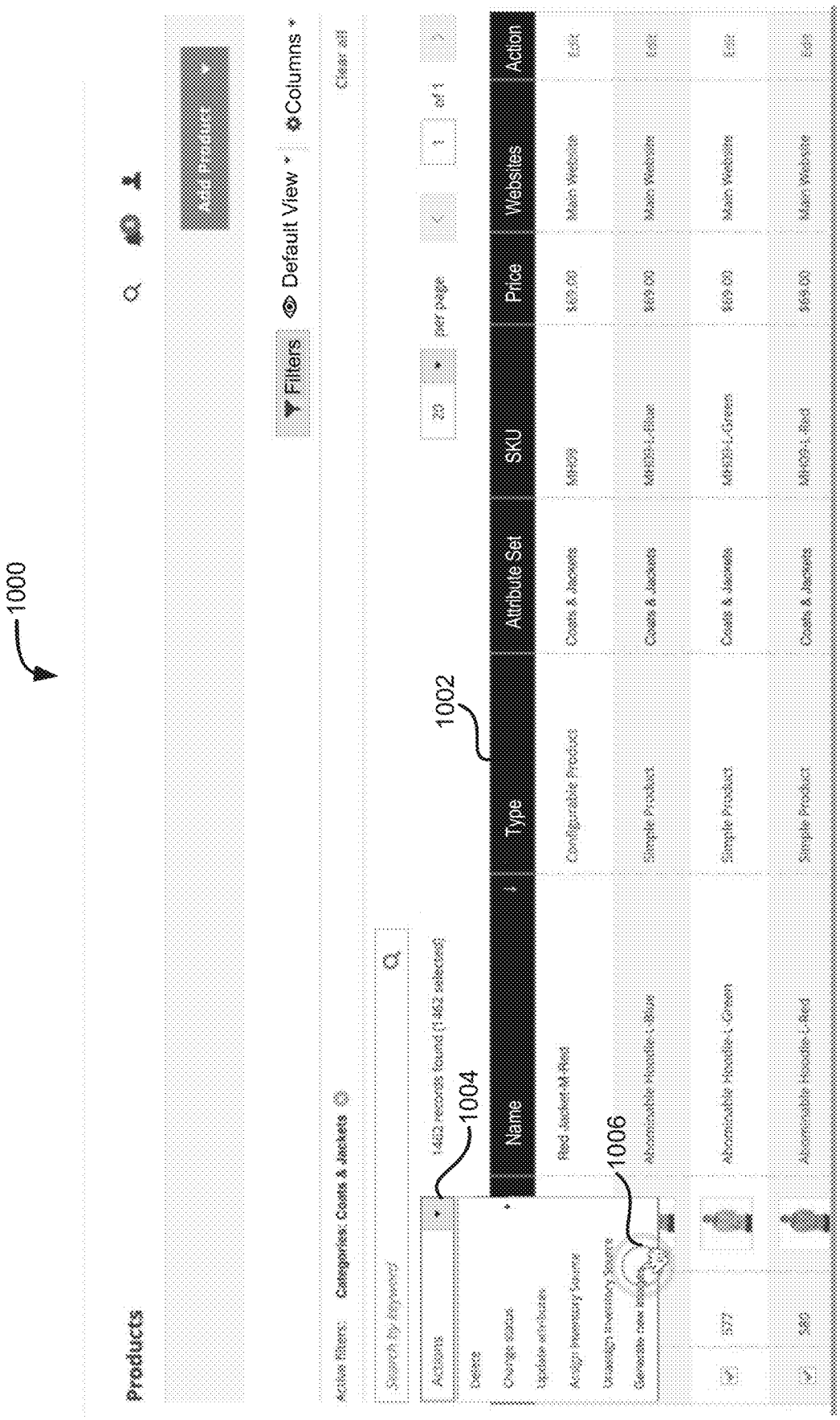
FIG. 10 depicts an example of a GUI for generating new synthetic images for multiple products selected by way of a GUI as shown in FIG. 9, according to certain embodiments of the present disclosure.

FIGS. 9-13 show a process for mass generation of synthetic images for multiple products. FIG. 9 depicts an example of a GUI 900 for using various filters to select multiple products for generating new synthetic images 110 with geolocation-based backgrounds, according to certain embodiments of the present disclosure. An operator of a marketplace platform can select multiple products using various filters displayed in GUI 900. In this example, the operator of the marketplace platform filters the products by categories and selects "Coats & Jackets" 902, for which new synthetic images are to be generated. When the operator clicks or presses the "Apply Filters" button 904, a list of products satisfying the filters can be displayed in GUI 1000 as shown in FIG. 10.

FIG. 10 depicts an example of a GUI 1000 for generating new synthetic images for multiple products selected by way of a GUI as shown in FIG. 9, according to certain embodiments of the present disclosure. A partial list 1002 of filtered products are displayed in the GUI 1000. The operator of the marketplace platform can select one or more products for certain actions 1004. By selecting "generate new images" 1006 from actions 1004, an image generation process is triggered in the image generation server 102 for selected products from the list of filtered products.

Figure 11:
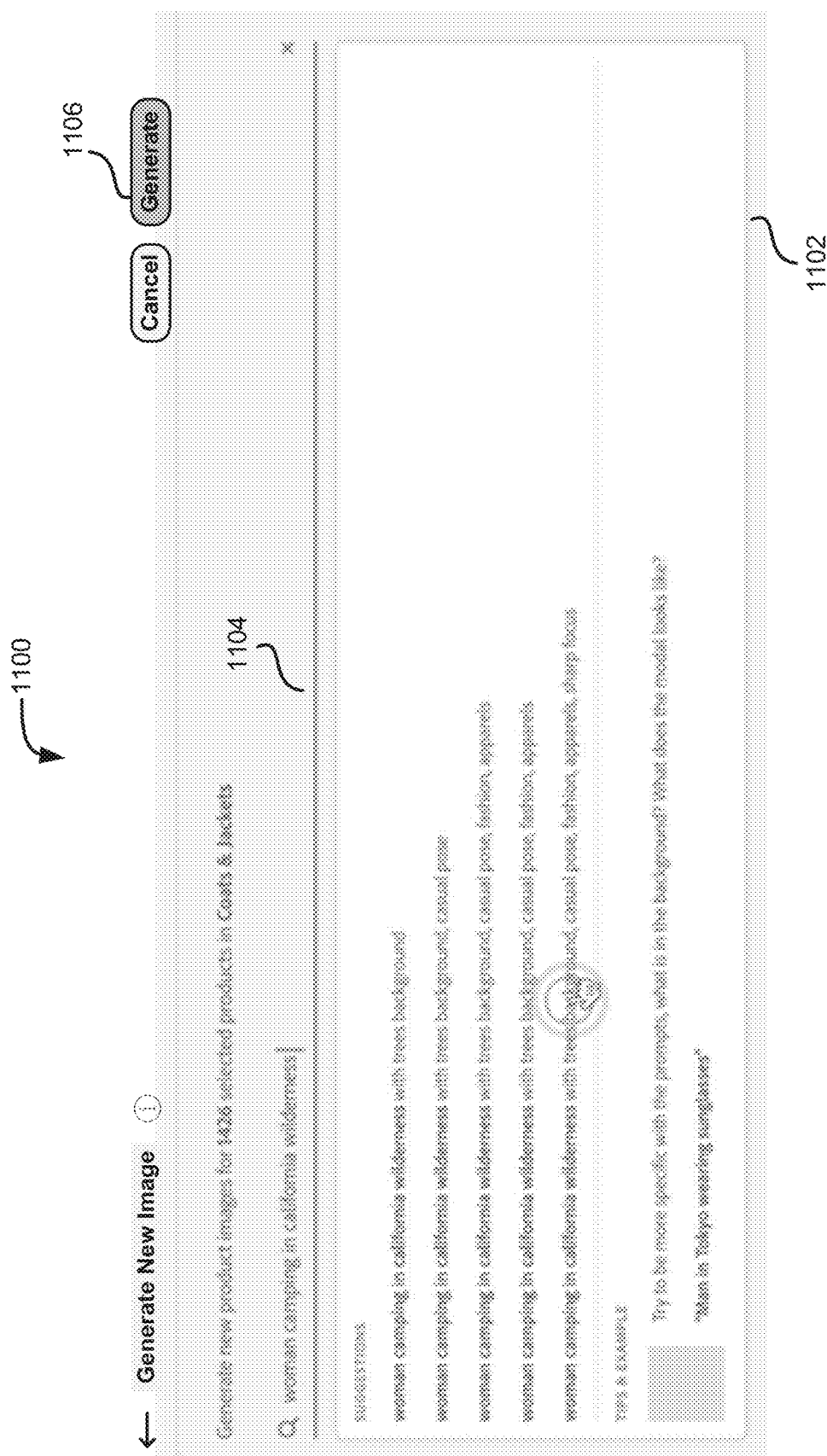
FIG. 11 depicts another example of a GUI for providing a descriptive prompt for generation of backgrounds for new synthetic images to be generated, according to certain embodiments of the present disclosure.

FIG. 11 depicts an example of a GUI 1100 for providing a descriptive prompt for generation of backgrounds for new synthetic images to be generated, according to certain embodiments of the present disclosure. The GUI 1100 enables the operator to type their own prompt or select a prompt from suggested prompts 1102 to fill in the field 1104. The suggested prompts 1102 are generated by a prompt generation module 106 on an image generation server 102. New synthetic images can be generated based on the prompt in the field 1104 when the operator clicks or press the "generate" button 1106.

Figure 12:
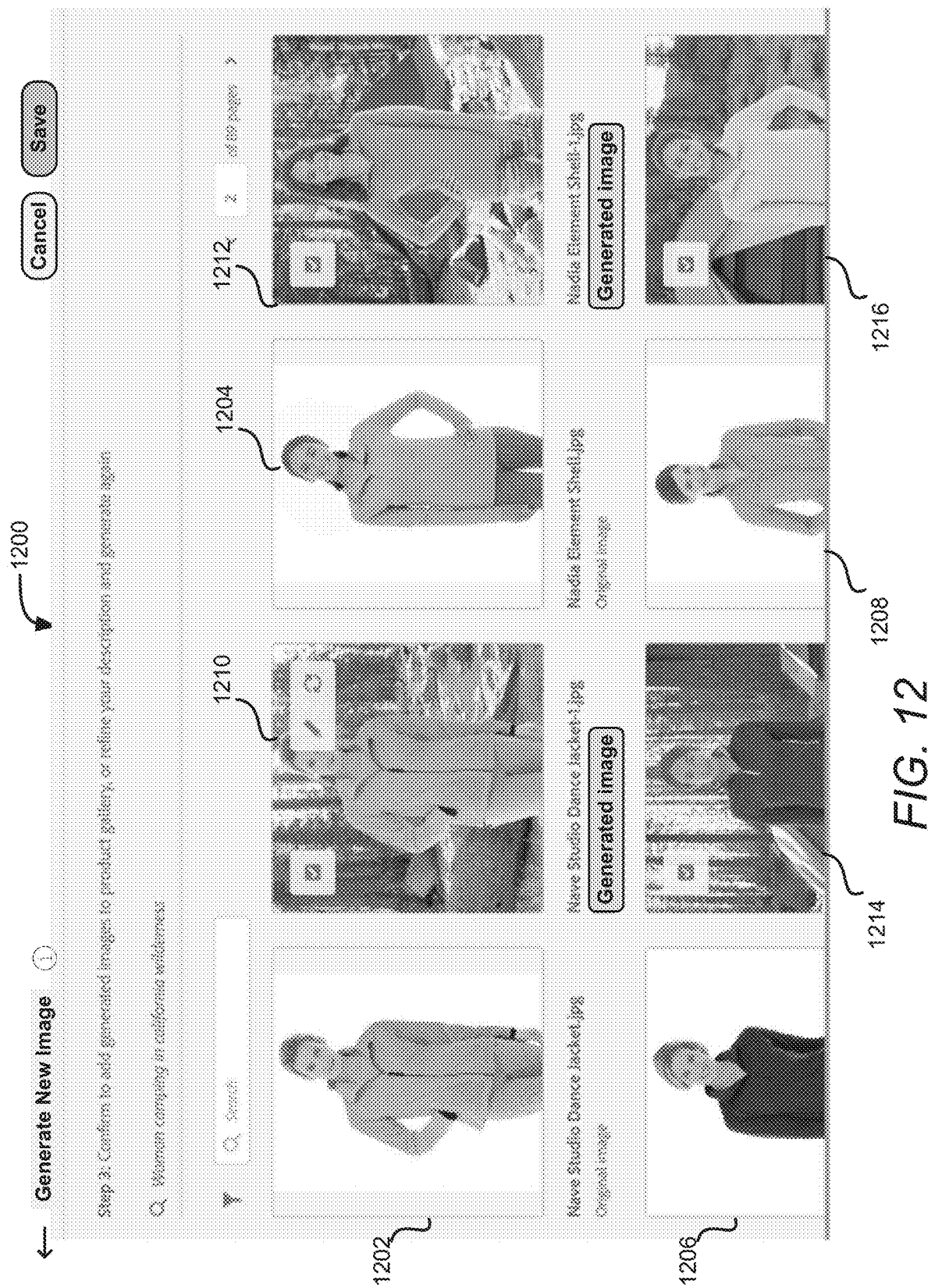
FIG. 12 depicts an example of a GUI displaying new synthetic images generated based on the prompt provided in FIG. 11, according to certain embodiments of the present disclosure.

FIG. 12 depicts an example of a GUI 1200 displaying new synthetic images generated based on the prompt provided in FIG. 11, according to certain embodiments of the present disclosure. FIG. 12 only shows a subset of new synthetic images generated, by the image generation module 108, for a corresponding subset of products selected by the operator in FIG. 10. For example, images 1202, 1204, 1206, and 1208 are original product images with white backgrounds. Images 1210, 1212, 1214, and 1216 are new synthetic images with backgrounds generated based on the prompt "woman camping in California wilderness" as provided in FIG. 11. The operator of the marketplace platform may select one or more new synthetic images to be used on the marketplace platform and displayed to customers in California.

FIG. 13 depicts an example of a GUI 1300 displaying synthetic images with geolocation-based backgrounds on a marketplace platform, according to certain embodiments of the present disclosure. The image generation module 108 generated synthetic images 1302-1316 for corresponding products based on the prompt "woman camping in California wilderness" as provided in FIG. 11. Synthetic images 1302-1316 are deployed on the marketplace platform and displayed to customers in California.

Figure 14:
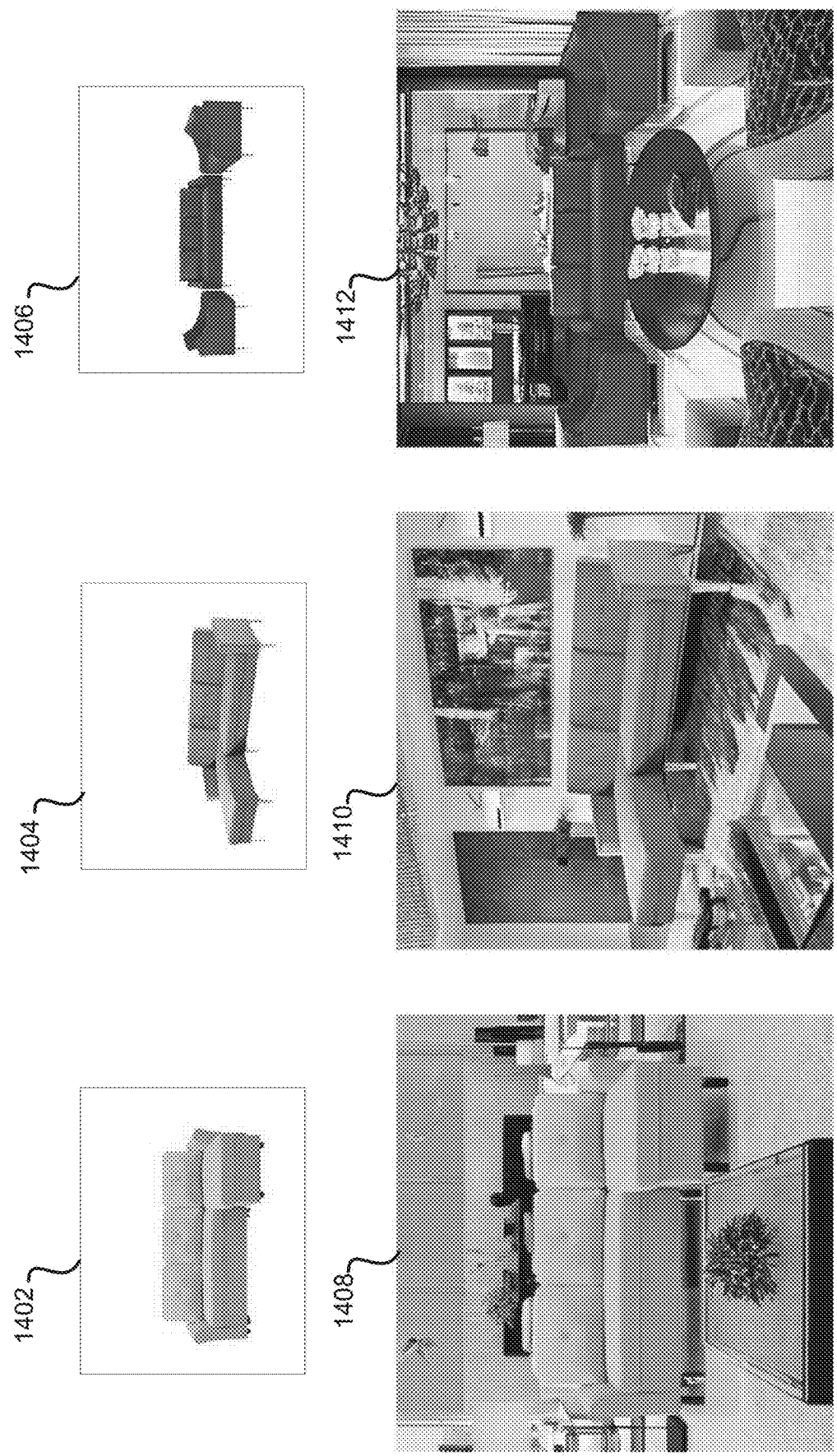
FIG. 14 depicts examples of object images with white backgrounds and corresponding synthetic images generated with geolocation-based backgrounds, according to certain embodiments of the present disclosure.

FIG. 14 depicts examples of object images with white backgrounds and corresponding synthetic images generated with geolocation-based backgrounds, according to certain embodiments of the present disclosure. Object images 1402, 1404, and 1406 shows different sofa sets in a white background. Synthetic images 1408, 1410, and 1412 shows corresponding sofa sets with different interior backgrounds. The interior backgrounds in synthetic images 1408, 1410, and 1412 can be generated by an image generation server 102 for a marketplace platform for a specific geographic market. A geolocation module 104 of the image generation server 102 can collect context data related to the specific geographic market. A prompt generation module 106 can select certain context data 116 to generate prompts for an image generation module 108 for generating backgrounds for the object images 1402, 1404, and 1406. Among the context data 116, demographic composition, income level, urbanization level may be weighted more heavily than other context data such as landmarks or events for generating interior backgrounds. Based on the demographic composition, occupation, income level, urbanization level, and other relevant context data related to the culture or population of the geographic market, the prompt generation module 106 can generate prompts describing certain interior features. An operator of the marketplace platform can select a prompt from the generated prompts in a GUI similar to GUI 700 in FIG. 7 or GUI 1100 in FIG. 11. In some examples, the image generation module 108 of the image generation server 102 generates certain interior background images 122 based on an operator-selected prompt and combines with the object images 1402, 1404, and 1406 to generate synthetic images 1408, 1410, and 1410. In some examples, the prompt generation module 106 may generate an optimal prompt automatically, and the image generation module 108 generates the interior background images 122 based on the optimal prompt and generate new synthetic images 1408, 1410, and 1412 with the generated interior background images 122. Alternatively, the image generation module 108 of the image generation server 102 generates synthetic images 1408, 1410, and 1412 directly by generating backgrounds in object images 1402, 1404, and 1406 based on a prompt selected by an operator or an optimal prompt automatically generated by the prompt generation module 106.

Figure 15:
FIG. 15 depicts an example of a GUI displaying synthetic images with geolocation-based model faces deployed on a marketplace platform, according to certain embodiments of the present disclosure.
Figure 16:
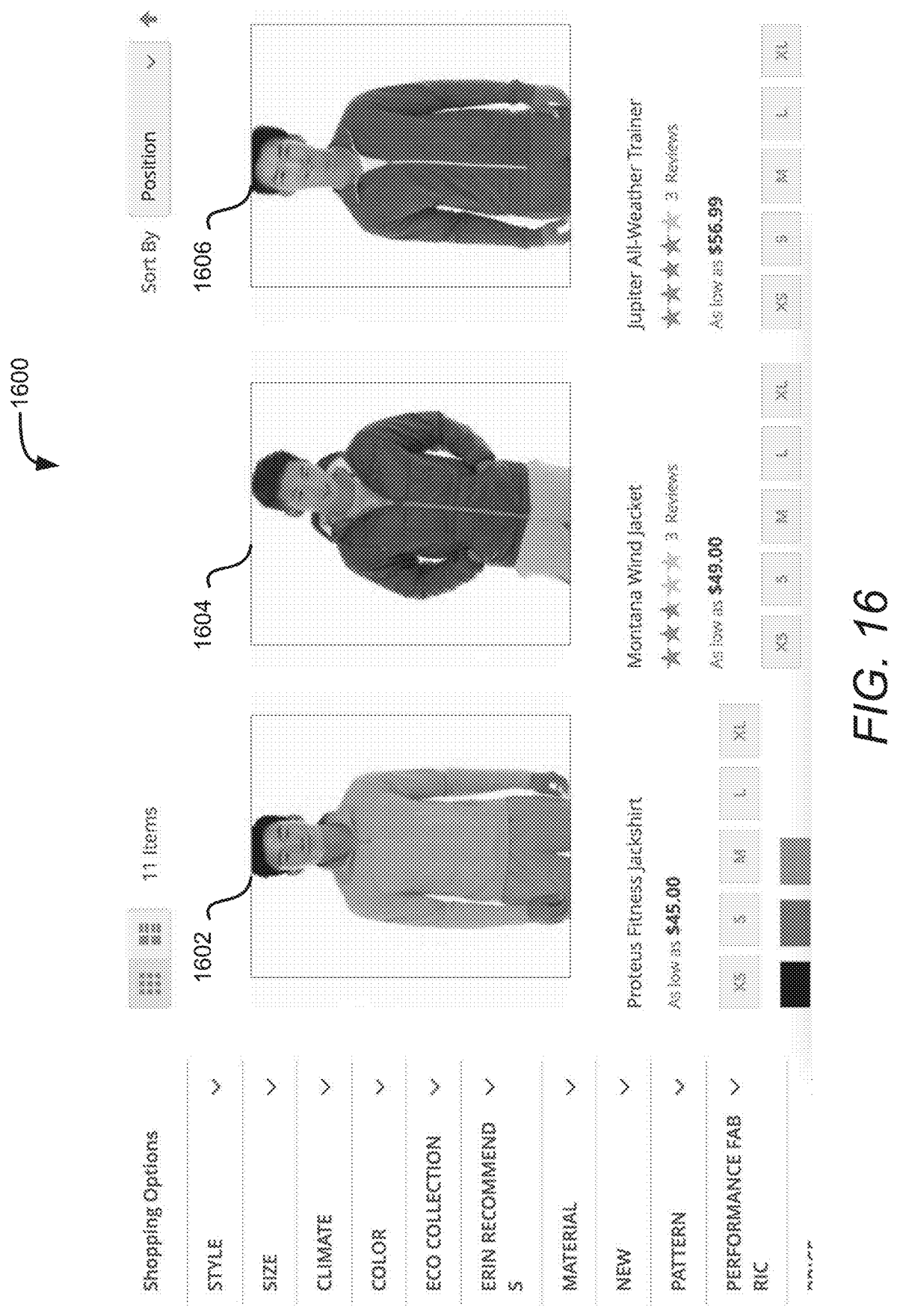

FIGS. 15 and 16 illustrate synthetic images for the same products but generated for different geographic markets with model faces representing the customers in the corresponding geographic markets. FIG. 15 depicts an example of a GUI 1500 displaying synthetic images with geolocation-based model faces deployed on a marketplace platform, according to certain embodiments of the present disclosure. In this example, the faces of the models in synthetic images 1502, 1504, and 1506 are generated specifically for the South American market. The image generation process is generally described at block 204 in FIG. 2. For example, an image generation module 108 generates face images 140 and further generates the synthetic images 1502, 1504, and 1506 by applying the face images 140 to the face region of the models in original images. Alternatively, the image generation module 108 generates synthetic images 1502, 1504, and 1506 by regenerating the face region of the models in the original images.

FIG. 16 depicts another example of a GUI 1600 displaying synthetic images with geolocation-based model faces deployed on the market platform, according to certain embodiments of the present disclosure. In this example, the faces of the models in synthetic images 1602, 1604, and 1606 are generated specifically for the Chinese market. The products shown in synthetic images 1602, 1604, and 1606 are the same as in synthetic images 1502, 1504, and 1506. However, the model faces are different depending on which geographic market a customer of the marketplace platform is located.

Figure 17:
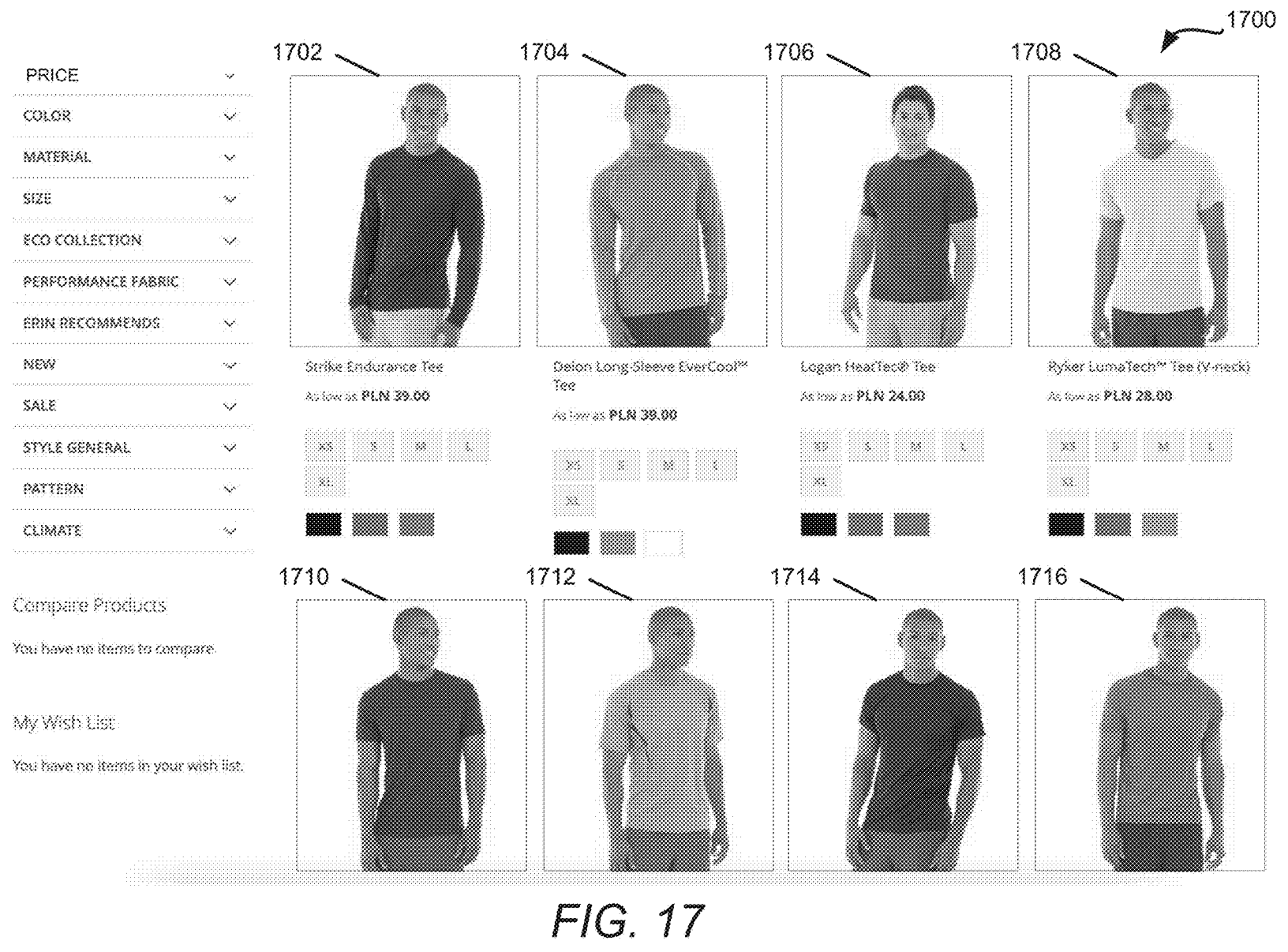

FIG. 17 depicts an example of a GUI 1700 displaying original object images with white backgrounds on a marketplace platform, according to certain embodiments of the present disclosure. The original object images 1702-1716 are shot with a human model wearing corresponding products initially. These original object images can be displayed to all customer on the marketplace platform. However, customers in a geographic market who look different from the models may not find the images or the products appealing to them.

Figure 18:
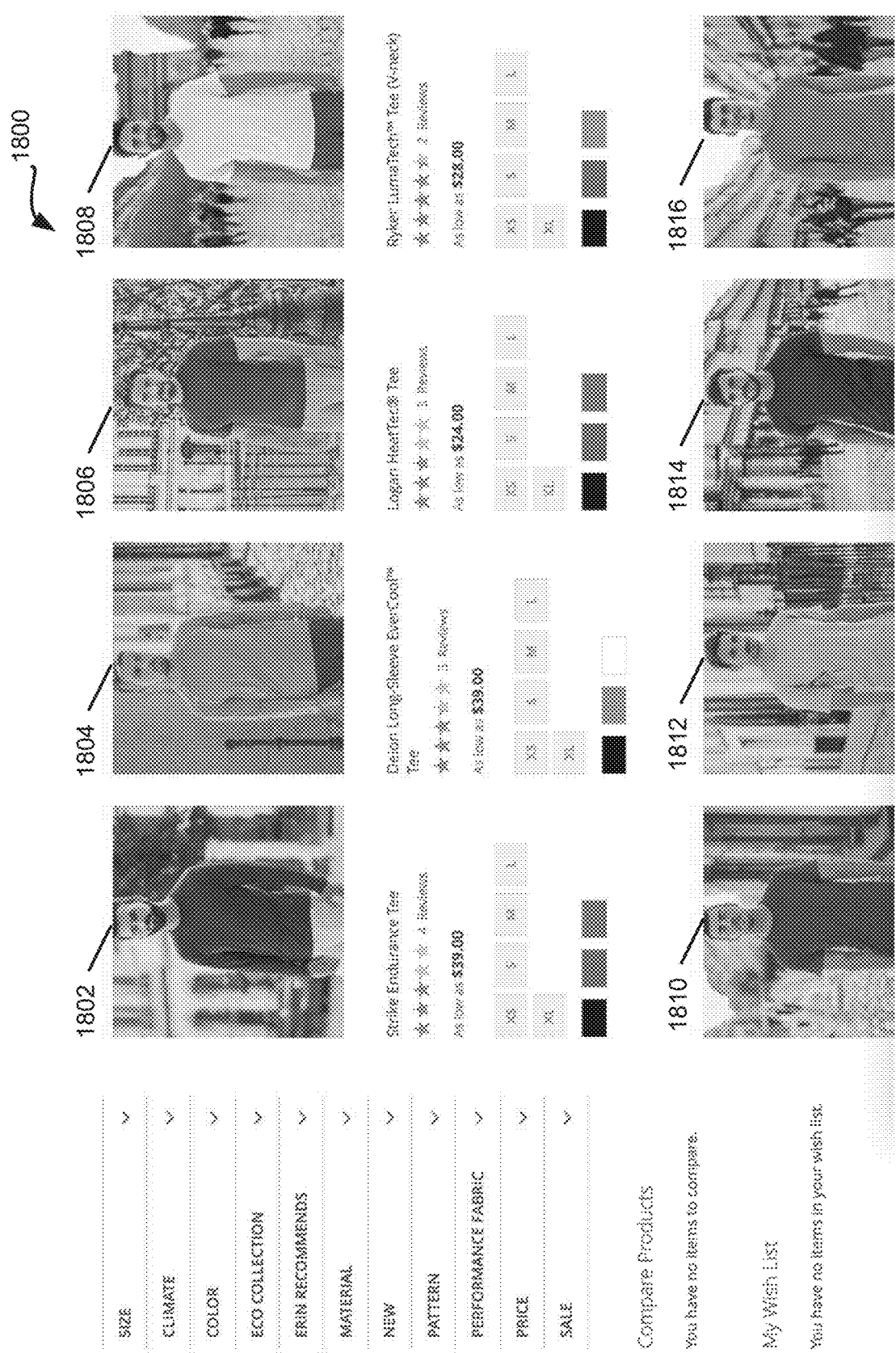
FIG. 18 depicts an example of a GUI displaying synthetic images with geolocation-based backgrounds and geolocation-based model faces deployed on a market platform for a specific geographic market, according to certain embodiments of the present disclosure.

FIG. 18 depicts an example of a GUI 1800 displaying synthetic images with geolocation-based backgrounds and geolocation-based model faces deployed on a marketplace platform for a specific geographic market, according to certain embodiments of the present disclosure. Synthetic images 1802-1816 are generated using the techniques in the present disclosure with geolocation-based backgrounds and geolocation-based model faces for a specific geographic market for the same products in original object images 1702-1716 in FIG. 17. In this example, the geographic market is France, and a customer in Paris of France is visiting the marketplace platform. Synthetic images 1802-1816 are displayed to the customer. The backgrounds in synthetic images 1802-1816 are based on certain landmark features in Paris. The model faces are based on the demographic composition in Paris.

Figure 19:
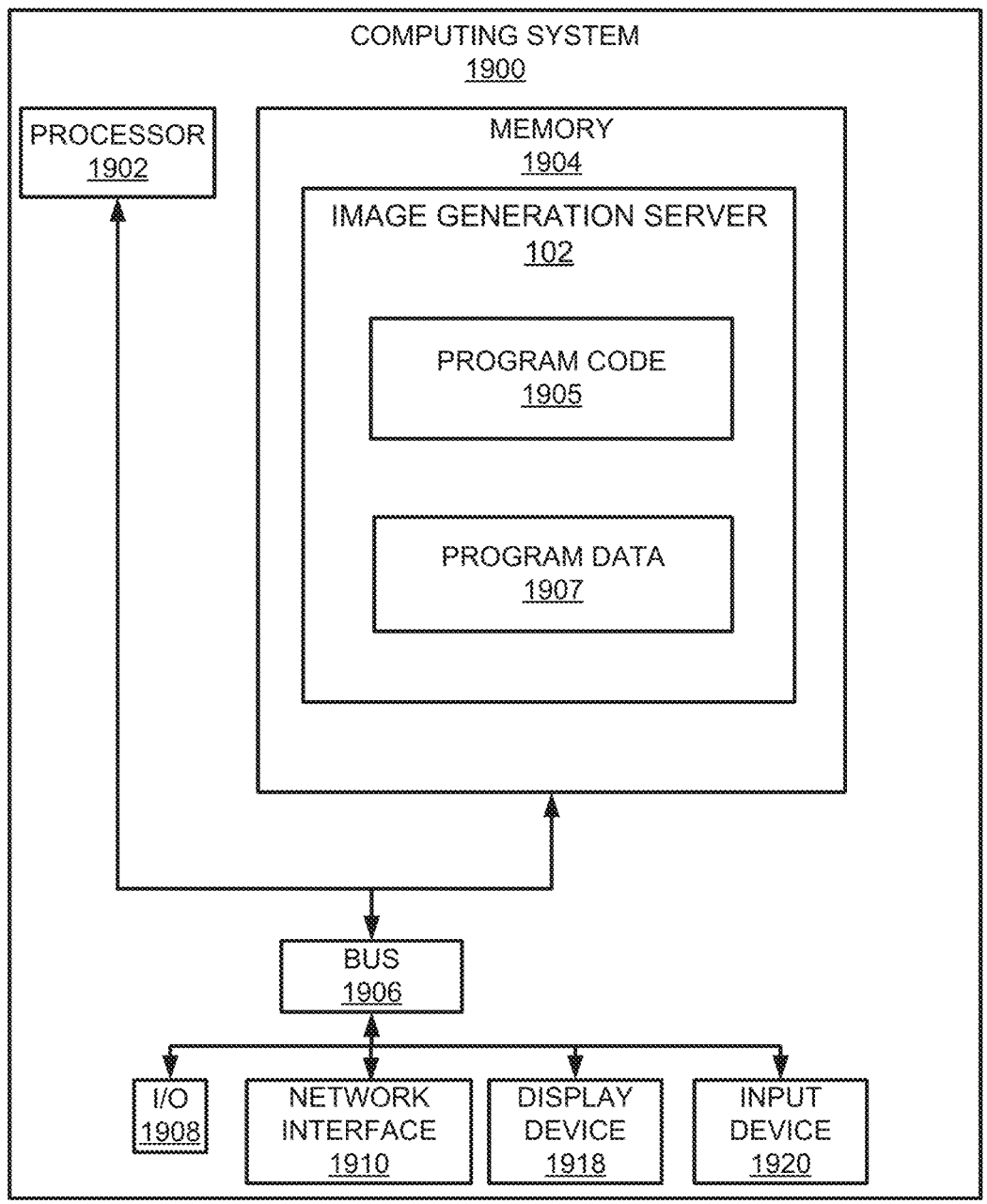
FIG. 19 depicts an example of a computing system for implementing certain embodiments of the present disclosure.

Any suitable computing system or group of computing systems can be used for performing the operations described herein. For example, FIG. 19 depicts an example of the computing system 1900 for implementing certain embodiments of the present disclosure. The implementation of computing system 1900 could be used to implement the image generation server 102. In other embodiments, a single computing system 1900 having devices similar to those depicted in FIG. 19 (e.g., a processor, a memory, etc.) combines the one or more operations depicted as separate systems in FIG. 1.

The depicted example of a computing system 1900 includes a processor 1902 communicatively coupled to one or more memory devices 1904. The processor 1902 executes computer-executable program code stored in a memory device 1904, accesses information stored in the memory device 1904, or both. Examples of the processor 1902 include a microprocessor, an application-specific integrated circuit ("ASIC"), a field-programmable gate array ("FPGA"), or any other suitable processing device. The processor 1902 can include any number of processing devices, including a single processing device.

A memory device 1904 includes any suitable non-transitory computer-readable medium for storing program code 1905, program data 1907, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 1900 executes program code 1905 that configures the processor 1902 to perform one or more of the operations described herein. Examples of the program code 1905 include, in various embodiments, the application executed by a geolocation module 104 for receiving and mapping geolocations to context data for a geographic region of interest, a prompt generation module 106 for generating prompts based on context data associated with certain geolocations, an image generation module 108 for generating images based on the prompts generated by the prompt generation module 106, or other suitable applications that perform one or more operations described herein. The program code may be resident in the memory device 1904 or any suitable computer-readable medium and may be executed by the processor 1902 or any other suitable processor.

In some embodiments, one or more memory devices 1904 stores program data 1907 that includes one or more datasets and models described herein. Examples of these datasets include extracted images, feature vectors, aesthetic scores, processed object images, etc. In some embodiments, one or more of data sets, models, and functions are stored in the same memory device (e.g., one of the memory devices 1904). In additional or alternative embodiments, one or more of the programs, data sets, models, and functions described herein are stored in different memory devices 1904 accessible via a data network. One or more buses 1906 are also included in the computing system 1900. The buses 1906 communicatively couples one or more components of a respective one of the computing system 1900.

In some embodiments, the computing system 1900 also includes a network interface device 1910. The network interface device 1910 includes any device or group of devices suitable for establishing a wired or wireless data connection to one or more data networks. Non-limiting examples of the network interface device 1910 include an Ethernet network adapter, a modem, and/or the like. The computing system 1900 is able to communicate with one or more other computing devices (e.g., a user computing device 130) via a data network using the network interface device 1910.

The computing system 1900 may also include the number of external or internal devices, an input device 1920, a display device 1918, or other input or output devices. For example, the computing system 1900 is shown with one or more input/output ("I/O") interfaces 1908. An I/O interface 1908 can receive input from input devices or provide output to output devices. An input device 1920 can include any device or group of devices suitable for receiving visual, auditory, or other suitable input that controls or affects the operations of the processor 1902. Non-limiting examples of the input device 1920 include a touchscreen, a mouse, a keyboard, a microphone, a separate mobile computing device, etc. A display device 1918 can include any device or group of devices suitable for providing visual, auditory, or other suitable sensory output. Non-limiting examples of the display device 1918 include a touchscreen, a monitor, a speaker, a separate mobile computing device, etc.

Although FIG. 19 depicts the input device 1920 and the display device 1918 as being local to the computing device that executes the image generation server 102, other implementations are possible. For instance, in some embodiments, one or more of the input device 1920 and the display device 1918 can include a remote client-computing device that communicates with the computing system 1900 via the network interface device 1910 using one or more data networks described herein.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alternatives to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

That which is claimed is:

1. A method performed by one or more processing devices, comprising:
    determining, by a geolocation module, a set of geolocations associated with a geographic region of interest, wherein each geolocation of the set of geolocations is mapped to context data associated with the geolocation;
    generating, by a prompt generation module, multiple prompts based on the set of geolocations and the context data, wherein the prompt generation module comprises a first generative artificial intelligence (AI) model;
    generating, by an image generation module, a set of background images based on the multiple prompts, wherein the image generation module comprises a second generative AI model; and
    generating, by the image generation module, a plurality of synthetic images, wherein each synthetic image comprises a background image from the set of background images and an image of a target object.

2. The method of claim 1, wherein the target object comprises a product provided by an online marketplace platform.

3. The method of claim 1, wherein the context data associated with each geolocation of set of the geolocations comprises one or more of places of interest, terrain, climate, weather, or events associated with the geolocation.

4. The method of claim 1, further comprising:
    weighing, by the prompt generation module, the context data based on at least one of (i) selection of one or more of the synthetic images for display on an online platform data, or (ii) behavioral data associated with user interactions with the plurality of synthetic images; and
    generating, by the prompt generation module, the multiple prompts based on the context data and corresponding weights.

5. The method of claim 4, wherein the behavioral data comprises user engagement data and user conversion data.

6. The method of claim 4, wherein the prompt generation module uses a reinforcement learning model to weight the context data.

7. The method of claim 1, further comprising:
causing the plurality of synthetic images to be displayed via a graphical user interface (GUI);
receiving a selection of one or more synthetic images; and
in response to the selection, transmitting the one or more selected synthetic images to an online platform for deployment.

8. A system, comprising:
a geolocation module configured to determine a set of geolocations associated with a geographic region of interest, wherein each geolocation of the set of geolocations is mapped to context data associated with the geolocation;
a prompt generation module configured to generate multiple prompts based on the set of geolocations and the context data, wherein the prompt generation module comprises a first generative artificial intelligence (AI) model; and
an image generation module configured to generate a plurality of synthetic images based on an image of a target object and an input prompt from the multiple prompts, wherein the image generation module comprises a second generative AI model, and wherein each synthetic image depicts the target object in a background generated based on the input prompt.

9. The system of claim 8, wherein the target object comprises a product provided by an online marketplace platform.

10. The system of claim 8, wherein the context data associated with each geolocation of set of the geolocations comprises one or more of places of interest, terrain, climate, weather, or events associated with the geolocation.

11. The system of claim 8, wherein the prompt generation module is further configured to:
weight the context data based on at least one of (i) selection of one or more of the synthetic images for display on an online platform data, or (ii) behavioral data associated with user interactions with the plurality of synthetic images; and
generate the multiple prompts based on the context data and corresponding weights.

12. The system of claim 11, wherein the behavioral data comprises user engagement data and user conversion data.

13. The system of claim 11, wherein the prompt generation module is configured to weight the context data uses a reinforcement learning model.

14. The system of claim 8, wherein the image generation module is further configured to:
cause the plurality of synthetic images to be displayed via a graphical user interface (GUI);
receive a selection of one or more synthetic images; and
in response to the selection, transmit the one or more selected synthetic images to an online platform for deployment.

15. A non-transitory computer-readable medium, storing executable instructions, which when executed by a processing device, cause the processing device to perform operations comprising:
determining a set of geolocations associated with a geographic region of interest, wherein each geolocation of the set of geolocations is mapped to context data associated with the geolocation;
generating multiple prompts based on the set of geolocations and the context data using a first generative artificial intelligence (AI) model;
receiving a selection of a prompt from the multiple prompts to determine a selected prompt; and
a step for generating a plurality of synthetic images based on the selected prompt, wherein each synthetic image comprises an image of a target object and a background image corresponding to the selected prompt.

16. The non-transitory computer-readable medium of claim 15, wherein the target object comprises a product provided by an online marketplace platform.

17. The non-transitory computer-readable medium of claim 15, wherein the context data associated with each geolocation of set of the geolocations comprises one or more of places of interest, terrain, climate, weather, or events associated with the geolocation.

18. The non-transitory computer-readable medium of claim 15, wherein the executable instructions, which when executed by a processing device, cause the processing device to perform further operations comprising:
weighing the context data based on at least one of (i) selection of one or more of the plurality of synthetic images for display on an online platform data, or (ii) behavioral data associated with user interactions with the one or more of the plurality of synthetic images using a reinforcement learning model; and
generating the multiple prompts based on the context data and corresponding weights.

19. The non-transitory computer-readable medium of claim 18, wherein the behavioral data comprises user engagement data and user conversion data.

20. The non-transitory computer-readable medium of claim 15, wherein the executable instructions, which when executed by a processing device, cause the processing device to perform further operations comprising:
causing the plurality of synthetic images to be displayed via a graphical user interface (GUI);
receiving a selection of one or more synthetic images; and
in response to the selection, transmitting the one or more selected synthetic images to an online platform for deployment.

* * * * *